(12) United States Patent
Kim et al.

(10) Patent No.: US 11,993,665 B2
(45) Date of Patent: May 28, 2024

(54) HYBRID SUPPORTED CATALYST AND METHOD OF PREPARING POLYOLEFIN USING THE SAME

(71) Applicant: LG Chem, Ltd., Seoul (KR)

(72) Inventors: Sun Mi Kim, Daejeon (KR); Ue Ryung Seo, Daejeon (KR); Bog Ki Hong, Daejeon (KR); Eun Kyoung Song, Daejeon (KR); Daesik Hong, Daejeon (KR); Si Jung Lee, Daejeon (KR); Cheolhwan Jeong, Daejeon (KR); Kiju Um, Daejeon (KR)

(73) Assignee: LG Chem, Ltd., Seoul (KR)

( * ) Notice: Subject to any disclaimer, the term of this patent is extended or adjusted under 35 U.S.C. 154(b) by 523 days.

(21) Appl. No.: 17/294,743

(22) PCT Filed: Sep. 25, 2020

(86) PCT No.: PCT/KR2020/013052
§ 371 (c)(1),
(2) Date: May 18, 2021

(87) PCT Pub. No.: WO2021/060908
PCT Pub. Date: Apr. 1, 2021

(65) Prior Publication Data
US 2022/0017657 A1 Jan. 20, 2022

(30) Foreign Application Priority Data

Sep. 27, 2019 (KR) .......................... 10-2019-0120102
Sep. 27, 2019 (KR) .......................... 10-2019-0120103
Sep. 24, 2020 (KR) .......................... 10-2020-0124243

(51) Int. Cl.
*C08F 110/02* (2006.01)
*C08F 4/02* (2006.01)
*C08F 4/6592* (2006.01)
*C08F 8/20* (2006.01)

(52) U.S. Cl.
CPC .............. *C08F 110/02* (2013.01); *C08F 4/02* (2013.01); *C08F 4/65922* (2013.01); *C08F 8/20* (2013.01); *C08F 2420/00* (2013.01)

(58) Field of Classification Search
CPC .... C08F 4/65904; C08F 4/65925; C08F 4/02; C08F 2420/02; C08F 2420/07
USPC .......................................................... 526/114
See application file for complete search history.

(56) References Cited

U.S. PATENT DOCUMENTS

| | | | |
|---|---|---|---|
| 5,032,562 A | 7/1991 | Lo et al. | |
| 5,525,678 A | 6/1996 | Mink et al. | |
| 5,693,719 A | 12/1997 | Goto et al. | |
| 5,914,289 A | 6/1999 | Razavi | |
| 10,570,532 B2 | 2/2020 | Bae et al. | |
| 2001/0012496 A1 | 8/2001 | Agapiou et al. | |
| 2001/0020072 A1 | 9/2001 | Agapiou et al. | |
| 2005/0143536 A1 | 6/2005 | Graf et al. | |
| 2005/0244974 A1 | 11/2005 | Garcia-Franco et al. | |
| 2012/0123013 A1 | 5/2012 | Ek et al. | |
| 2013/0018154 A1 | 1/2013 | Buryak et al. | |
| 2015/0018491 A1 | 1/2015 | Satoh et al. | |
| 2015/0153878 A1 | 6/2015 | Kim | |
| 2016/0369020 A1 | 12/2016 | Sung et al. | |
| 2017/0158789 A1 | 6/2017 | Bellehumeur et al. | |
| 2017/0298538 A1 | 10/2017 | Bae et al. | |
| 2018/0258559 A1 | 9/2018 | Dadmun et al. | |
| 2019/0086308 A1 | 3/2019 | Lee et al. | |
| 2019/0263942 A1 | 8/2019 | Jeong et al. | |
| 2020/0002490 A1 | 1/2020 | Kin et al. | |
| 2020/0071509 A1 | 3/2020 | Borse et al. | |

(Continued)

FOREIGN PATENT DOCUMENTS

| | | |
|---|---|---|
| CN | 1359396 A | 7/2002 |
| CN | 1643004 A | 7/2005 |
| CN | 102869716 A | 1/2013 |

(Continued)

OTHER PUBLICATIONS

Extended European Search Report including Written Opinion for Application No. 20867639.5 dated Apr. 19, 2022, pp. 1-8.

(Continued)

*Primary Examiner* — Fred M Teskin
(74) *Attorney, Agent, or Firm* — Lerner David LLP

(57) ABSTRACT

Provided are a hybrid supported catalyst which includes two or more kinds of transition metal compounds having the following Chemical Formulas 1 and 2, thereby preparing a polyolefin, particularly, a high-density polyethylene having a molecular structure which is optimized to improve tensile strength of a chlorinated polyolefin compound, and a method of preparing a polyolefin using the same:

[Chemical Formula 1]

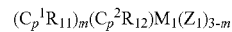

[Chemical Formula 2]

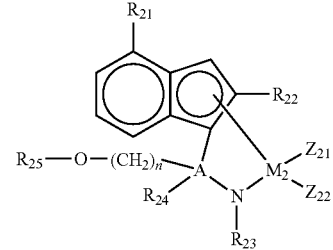

wherein all the variables are described herein.

17 Claims, No Drawings

(56) References Cited

U.S. PATENT DOCUMENTS

| | | |
|---|---|---|
| 2021/0095109 A1 | 4/2021 | Chandak et al. |
| 2022/0017663 A1 | 1/2022 | Jeong et al. |

FOREIGN PATENT DOCUMENTS

| | | |
|---|---|---|
| CN | 104024326 A | 9/2014 |
| CN | 105008439 A | 10/2015 |
| CN | 106062065 A | 10/2016 |
| CN | 106715480 A | 5/2017 |
| CN | 108290980 A | 7/2018 |
| CN | 109415450 A | 3/2019 |
| CN | 109890855 A | 6/2019 |
| CN | 109923133 A | 6/2019 |
| CN | 110012669 A | 7/2019 |
| JP | 2005528412 A | 9/2005 |
| JP | 2010189396 A | 9/2010 |
| JP | 5907079 B2 | 4/2016 |
| KR | 20000029853 A | 5/2000 |
| KR | 100269845 B1 | 10/2000 |
| KR | 20040091742 A | 10/2004 |
| KR | 20120123675 A | 11/2012 |
| KR | 101398607 B1 | 6/2014 |
| KR | 20150063823 A | 6/2015 |
| KR | 101603407 B1 | 3/2016 |
| KR | 20160112424 A | 9/2016 |
| KR | 20160121940 A | 10/2016 |
| KR | 20170076550 A | 7/2017 |
| KR | 20170106110 A | 9/2017 |
| KR | 20180058574 A | 6/2018 |
| KR | 20190086989 A | 7/2019 |
| KR | 20210020424 A | 2/2021 |
| WO | 9806728 A1 | 2/1998 |
| WO | 0014129 A1 | 3/2000 |
| WO | 0105852 A1 | 1/2001 |
| WO | 03091265 A1 | 11/2003 |
| WO | 2016167547 A1 | 10/2016 |
| WO | 2016204457 A1 | 12/2016 |
| WO | 2019125065 A1 | 6/2019 |

OTHER PUBLICATIONS

Extended European Search Report including Written Opinion for Application No. 20870137.5 dated Apr. 21, 2022, pp. 1-9.
Search Report dated Oct. 12, 2022 from the Office Action for Chinese Application No. 202080006137.1 issued Oct. 18, 2022, 3 pages.
Search Report dated Sep. 5, 2022 from the Office Action for Chinese Application No. 202080006688.8 issued Sep. 14, 2022, 3 pages.
Alexakis A. et al., "Mild Protection and Deprotection of Alcohols as Ter-Butyl Ethers in the Field of Pheromone Synthesis." Tetrahedron Letters, Jan. 1, 1988, vol. 29, No. 24, pp. 2951-2954.
Search report from International Application No. PCT/KR2020/013052, mailed Jan. 4, 2021.

HYBRID SUPPORTED CATALYST AND METHOD OF PREPARING POLYOLEFIN USING THE SAME

CROSS-REFERENCE TO RELATED APPLICATION(S)

This present application is a national phase entry under 35 U.S.C. § 371 of International Application No. PCT/KR2020/013052 filed Sep. 25, 2020, which claims priority from Korean Patent Application No. 10-2019-0120102 filed Sep. 27, 2019, Korean Patent Application No. 10-2019-0120103 filed Sep. 27, 2019, and Korean Patent Application No. 10-2020-0124243 filed Sep. 24, 2020, all of which are incorporated herein by reference in their entirety.

TECHNICAL FIELD

The present invention relates to a novel hybrid supported catalyst, and a method of preparing a polyolefin using the same.

BACKGROUND ART

Olefin polymerization catalyst systems may be divided into Ziegler-Natta and metallocene catalysts, and these highly active catalyst systems have been developed in accordance with their characteristics. Ziegler-Natta catalyst has been widely applied to commercial processes since it was developed in the 1950's. However, since the Ziegler-Natta catalyst is a multi-active site catalyst in which a plurality of active sites are mixed, it has a feature that a resulting polymer has a broad molecular weight distribution. Also, since a compositional distribution of comonomers is not uniform, there is a problem that it is difficult to obtain desired physical properties. In particular, physical properties may be deteriorated by polymer chains having a relatively low molecular weight due to a broad molecular weight distribution.

Meanwhile, the metallocene catalyst includes a main catalyst having a metallocene compound as a main component and an organometallic compound cocatalyst having aluminum as a main component. The stereoregularity, copolymerization characteristics, molecular weight, crystallinity, etc. of the resulting polymer may be controlled by changing a ligand structure of the catalyst and polymerization conditions.

U.S. Pat. No. 5,032,562 discloses a method for preparing a polymerization catalyst by supporting two different transition metal catalysts on one support. This catalyst is prepared by supporting a titanium (Ti)-based Ziegler-Natta catalyst which produces a high molecular weight and a zirconium (Zr)-based metallocene catalyst which produces a low molecular weight on one support, and results in a bimodal molecular weight distribution. This catalyst is disadvantageous in that the supporting procedure is complicated and morphology of polymers is poor due to a cocatalyst.

U.S. Pat. No. 5,525,678 discloses a method for using a catalyst system for olefin polymerization, in which a metallocene compound and a non-metallocene compound are simultaneously supported on a support to realize simultaneous polymerization of a high molecular weight polymer and a low molecular weight polymer. However, there are disadvantages that the metallocene compound and non-metallocene compound must be separately supported and the support must be pretreated with various compounds for supporting.

U.S. Pat. No. 5,914,289 discloses a method for controlling a molecular weight and a molecular weight distribution of polymers using metallocene catalysts which are respectively supported on supports. However, a large amount of solvent and a long period of time are required to prepare the supported catalysts, and a process of supporting metallocene catalysts on the respective supports is troublesome.

Moreover, according to the prior art, there is a disadvantage in that it is difficult to effectively prepare a polyolefin, in particular, an ethylene (co)polymer satisfying a desired level of density and a narrow molecular weight distribution at the same time.

Meanwhile, chlorinated polyethylene (CPE) is a product obtained by substituting a part of hydrogen in polyethylene with chlorine, and is used as an impact modifier for polyvinyl chloride (PVC) or cross-linked to manufacture cable sheath or a rubber hose.

Chlorinated polyethylene is used as a material for cable sheath in a structure that is thermally cross-linked by a peroxide-based cross-linking agent. In order to prevent damages to the sheath when the cable is bent, the chlorinated polyethylene must have excellent tensile strength in the cross-linked compound.

In the case of PVC compound products, the strength of the compound varies depending on the properties of the chlorinated polyolefin. In the case of general-purpose chlorinated polyethylenes which are widely known at present, since a polyethylene prepared using Ziegler-Natta catalyst is applied, the uniformity in chlorine distribution is decreased in the polyethylene due to the broad molecular weight distribution. There is also a disadvantage in that impact strength is insufficient when compounded with PVC.

Recently, in order to improve tensile strength of chlorinated polyolefin compounds for cables, high-density polyethylene (HDPE) prepared using a metallocene catalyst is chlorinated to produce a chlorinated polyethylene, and then a cross-linking agent is added thereto to prepare a compound.

In general, the higher the Mooney viscosity (MV) of the chlorinated polyethylene and the higher the Mooney viscosity of the compound, the higher the tensile strength of the chlorinated polyethylene and the compound, but there is a problem that processability decreases during compression.

Accordingly, there is a demand for preparation of a high-density polyethylene capable of improving tensile strength of a compound without deteriorating processability while having a similar Mooney viscosity, and development of a catalyst therefor.

DETAILED DESCRIPTION OF THE INVENTION

Technical Problem

There is provided a hybrid supported catalyst capable of preparing a polyolefin, particularly, a high-density polyethylene having a molecular structure which is optimized to improve tensile strength of a chlorinated polyolefin compound.

There is also provided a method of preparing a polyolefin capable of improving tensile strength of a chlorinated polyolefin compound by using the above-described hybrid supported catalyst.

Technical Solution

According to one embodiment of the present invention, provided is a hybrid supported catalyst including one or more of a first transition metal compound represented by the following Chemical Formula 1; one or more of a second transition metal compound represented by the following Chemical Formula 2; and a support on which the first and second transition metal compounds are supported:

$$(Cp^1R_{11})_m(Cp^2R_{12})M_1(Z_1)_{3-m} \qquad \text{[Chemical Formula 1]}$$

in Chemical Formula 1, $M_1$ is a transition metal of Group 4;

$Cp^1$ and $Cp^1$ are the same as or different from each other, and each independently, any one selected from the group consisting of cyclopentadienyl, indenyl, 4,5,6,7-tetrahydro-1-indenyl, and fluorenyl radicals, which are unsubstituted or substituted with $C_{1-20}$ hydrocarbon;

$R_{11}$ and $R_{12}$ are the same as or different from each other, and each independently, hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, $C_{2-20}$ alkynyl, or $C_{2-20}$ heteroaryl including one or more heteroatoms selected from the group consisting of N, O, and S;

$Z_1$ is halogen, $C_{1-20}$ alkyl, $C_{2-20}$ alkenyl, $C_{7-40}$ alkylaryl, $C_{7-40}$ arylalkyl, $C_{6-20}$ aryl, a substituted or unsubstituted amino group, $C_{2-20}$ alkylalkoxy, or $C_{7-40}$ arylalkoxy; and m is 1 or 0;

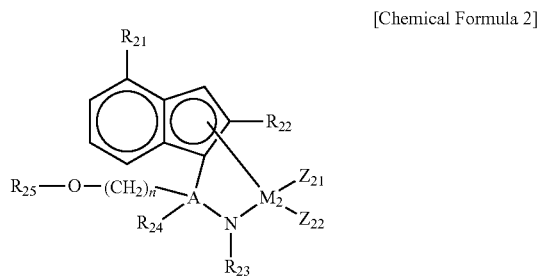

[Chemical Formula 2]

in Chemical Formula 2,

A is carbon or silicon, $M_2$ is a transition metal of Group 4, $R_{21}$ is $C_{6-20}$ aryl substituted with $C_{1-20}$ alkyl, $R_{22}$ is $C_{3-20}$ branched alkyl, $R_{23}$ to $R_{25}$ are each independently $C_{1-20}$ alkyl, $Z_{21}$ and $Z_{22}$ are each independently halogen or $C_{1-10}$ alkyl, and n is an integer of 1 to 10.

The present invention provides a method of preparing a polyolefin, the method including the step of polymerizing an olefin monomer in the presence of a catalyst composition including the hybrid supported catalyst.

In the present disclosure, the terms "the first", "the second", and the like are used to describe a variety of components, and these terms are merely employed to distinguish a certain component from other components.

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "contain" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, a hybrid supported catalyst according to one specific embodiment of the present invention, and a method of preparing a polyolefin using the same will be described in more detail.

Hybrid Supported Catalyst

High tensile strength is required for a chlorinated polyolefin used for rubber hoses or cable covering. The tensile strength of the chlorinated polyolefin may be improved by increasing the Mooney viscosity of the chlorinated polyolefin. However, in this case, there is a problem in that extrusion processability is deteriorated. To solve this problem, it is necessary to optimize a molecular structure of a polyolefin, specifically, a high-density polyethylene, which is applied to a chlorinated polyolefin.

In the present invention, it was found that when two kinds of transition metal compounds having specific structures are used in combination, a polyolefin to be produced has a structure in which a high molecular weight tail is formed in a molecular weight distribution curve, together with a minimized low molecular content, and thus the degree of cross-linking may be increased during the preparation of a chlorinated polyolefin, leading to improvement of tensile strength, thereby completing the present invention.

Specifically, the hybrid supported catalyst according to one embodiment of the present invention includes one or more of a first transition metal compound represented by Chemical Formula 1; one or more of a second transition metal compound represented by Chemical Formula 2; and a support on which the first and second transition metal compounds are supported.

In the hybrid supported catalyst, the substituents of Chemical Formulae 1 and 2 will be described in more detail as follows.

The $C_{1-20}$ alkyl group may include linear, branched, or cyclic alkyl groups, and specifically, a methyl group (Me), an ethyl group (Et), a propyl group (Pr), an isopropyl group, an n-butyl group (n-Bu), a tert-butyl group (t-Bu), a pentyl group (Pt), a hexyl group (Hx), a heptyl group, an octyl group, a cyclobutyl group, a cyclopentyl group, a cyclohexyl group, or the like, but is not limited thereto.

The $C_{1-20}$ alkylene group may include a linear or branched alkylene group, and specifically, a methylene group, an ethylene group, a propylene group, a butylene group, a pentylene group, a hexylene group, or the like, but is not limited thereto.

The $C_{4-20}$ cycloalkyl group refers to a cyclic alkyl group among the above-described alkyl groups, and specifically, may include a cyclobutyl group, a cyclopentyl group, a cyclohexyl group, or the like, but is not limited thereto.

The $C_{2-20}$ alkenyl group may include a linear or branched alkenyl group, and specifically, an allyl group, an ethenyl group, a propenyl group, a butenyl group, a pentenyl group, or the like, but is not limited thereto.

The $C_{6-20}$ aryl group may include a monocyclic or condensed ring aryl group, and specifically, a phenyl group, a biphenyl group, a naphthyl group, a phenanthrenyl group, a fluorenyl group, or the like, but is not limited thereto.

The $C_{1-20}$ alkoxy group may include a methoxy group, an ethoxy group, a phenyloxy group, a cyclohexyloxy group, or the like, but is not limited thereto.

The $C_{2-20}$ alkoxyalkyl group may be a functional group in which one or more hydrogens of the alkyl group as described above are substituted with alkoxy, and specifically, may include alkoxyalkyl groups such as a methoxymethyl group, a methoxyethyl group, ethoxymethyl group, an iso-propoxymethyl group, an iso-propoxyethyl group, an iso-propoxyhexyl group, a tert-butoxymethyl group, a tert-butoxyethyl group, a tert-butoxyhexyl group, or the like; or aryloxyalkyl groups such as a phenoxyhexyl group, or the like, but is not limited thereto.

The $C_{1-20}$ alkylsilyl group or the $C_{1-20}$ alkoxysilyl group may be a functional group in which one to three hydrogens of —$SiH_3$ are substituted with one to three alkyl groups or alkoxy groups as described above, and specifically, may include alkylsilyl groups such as a methylsilyl group, a dimethylsilyl group, a trimethylsilyl group, a dimethylethylsilyl group, a diethylmethylsilyl group, a dimethylpropylsilyl group, or the like; alkoxysilyl groups such as a methoxysilyl group, a dimethoxysilyl group, a trimethoxysilyl group, a dimethoxyethoxysilyl group, or the like; alkoxyalkylsilyl groups such as a methoxydimethylsilyl group, a diethoxymethylsilyl group, a dimethoxypropylsilyl group, or the like, but is not limited thereto.

The $C_{1-20}$ silylalkyl group is a functional group in which one or more hydrogens of the alkyl group as described above are substituted with silyl, and specifically, may include —$CH_2$—$SiH_3$, a methylsilylmethyl group, a dimethylethoxysilylpropyl group, or the like, but is not limited thereto.

The halogen may be fluorine (F), chlorine (Cl), bromine (Br), or iodine (I).

The sulfonate group has a structure of —O—$SO_2$—R', wherein R' may be a $C_{1-20}$ alkyl group. Specifically, the $C_{1-20}$ sulfonate group may include a methanesulfonate group, a phenylsulfonate group, or the like, but is not limited thereto.

The heteroaryl is $C_{2-20}$ heteroaryl including one or more of N, O, and S as a heteroatom, and specific examples thereof may include xanthene, thioxanthen, thiophene, furan, pyrrole, imidazole, thiazole, oxazole, oxadiazole, triazole, pyridyl, bipyridyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, or the like, but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; silyl; alkylsilyl or alkoxysilyl; phosphine; phosphide; sulfonate; and sulfone.

Further, the transition metal of Group 4 may include titanium (Ti), zirconium (Zr), hafnium (Hf), or the like, but is not limited thereto.

In the hybrid supported catalyst according to one embodiment of the present invention, the first transition metal compound represented by Chemical Formula 1 may easily prepare a low-molecular-weight polymer while having high polymerization activity, and the second transition metal compound may easily prepare an ultra-high-molecular-weight polymer. Therefore, by controlling a mixing ratio of the first and second transition metal compounds in the hybrid supported catalyst, the low molecular content in the prepared polymer may be minimized, and the molecular weight distribution may be increased due to the ultra-high-molecular weight characteristic by the second transition metal compound, and viscosity may be easily controlled. Therefore, when a chlorinated polyolefin is prepared by using the polymer thus prepared, crosslinking efficiency may be increased, thereby improving tensile strength.

Specifically, the first transition metal compound represented by Chemical Formula 1 is a non-crosslinked compound containing ligands of $Cp^1$ and $Cp^2$. The ligands of $Cp^1$ and $Cp^2$ may be the same as or different from each other, and each independently, any one selected from the group consisting of cyclopentadienyl, indenyl, 4,5,6,7-tetrahydro-1-indenyl, and fluorenyl radicals. These ligands may be substituted with one or more, or one to three of $C_{1-20}$ hydrocarbon, more specifically, $C_{1-10}$ alkyl. As described, the ligands of $Cp^1$ and $Cp^2$ may have an unshared electron pair which may act as a Lewis base, thereby exhibiting a high polymerization activity. In particular, when the ligands of $Cp^1$ and $Cp^2$ are cyclopentadienyl having relatively low steric hindrance, they may exhibit high polymerization activity and low hydrogen reactivity, thereby polymerizing a low-molecular-weight olefin polymer with high activity.

Further, the ligands of $Cp^1$ and $Cp^2$ may easily control, for example, characteristics of the olefin polymer to be prepared, such as chemical structure, molecular weight, molecular weight distribution, mechanical properties, transparency, etc., by controlling the effect of steric hindrance according to the kind of substituted functional groups. Specifically, the ligands of $Cp^1$ and $Cp^2$ may be substituted with $R_{11}$ and $R_{12}$, respectively. In this regard, $R_{11}$ and $R_{12}$ are the same as or different from each other, and each independently, hydrogen, $C_{1-20}$ alkyl, $C_{2-20}$ alkoxyalkyl, $C_{6-20}$ aryl, $C_{7-20}$ arylalkyl, furanyl, or thiophene, and more specifically, $C_{1-10}$ alkyl such as n-butyl, etc.; $C_{2-10}$ alkoxyalkyl such as t-butoxyhexyl, etc.; $C_{6-20}$ aryl such as phenyl, etc.; $C_{7-20}$ arylalkyl such as phenylbutyl, etc.; furanyl, or thiophenyl. In terms of excellent catalytic activity, $R_{11}$ and $R_{12}$ are the substituents defined as above, wherein at least one of $R_{11}$ and $R_{12}$ may be $C_{2-20}$ alkoxyalkyl, or $C_{2-10}$ alkoxyalkyl.

Further, $M_1(Z_1)_{3-m}$ exists between the ligands of $Cp^1$ and $Cp^2$, and $M_1(Z_1)_{3-m}$ may affect storage stability of a metal complex. To more effectively ensure the effect, $Z_1$ may be each independently halogen or $C_{1-20}$ alkyl, and more specifically, each independently F, Cl, Br, or I. Further, $M_1$ may be Ti, Zr, or Hf, and more specifically, Zr or Hf, and much more specifically, Zr.

More specifically, in the first transition metal compound, $M_1$ is Ti, Zr, or Hf; $Cp^1$ and $Cp^2$ are the same as or different from each other, and each independently, any one selected from the group consisting of cyclopentadienyl, indenyl, 4,5,6,7-tetrahydro-1-indenyl, and fluorenyl radicals, which may be unsubstituted or substituted with $C_{1-10}$ alkyl; $R_{11}$ and $R_{12}$ are each independently hydrogen, $C_{1-20}$ alkyl, $C_{2-20}$ alkoxyalkyl, $C_{6-20}$ aryl, $C_{7-20}$ arylalkyl, furanyl, or thiophenyl, wherein at least one of $R_{11}$ and $R_{12}$ is $C_{2-20}$ alkoxyalkyl; $Z_1$ is halogen.

The first transition metal compound represented by Chemical Formula 1 may be, for example, a compound represented by any one of the following structural formulae, but is not limited thereto:

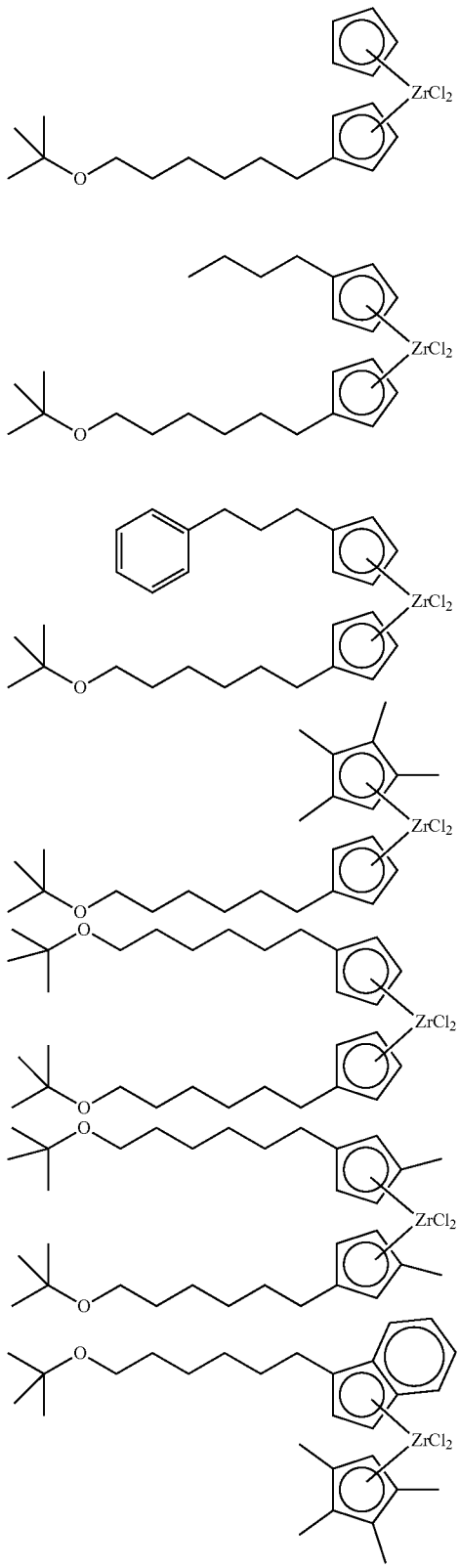

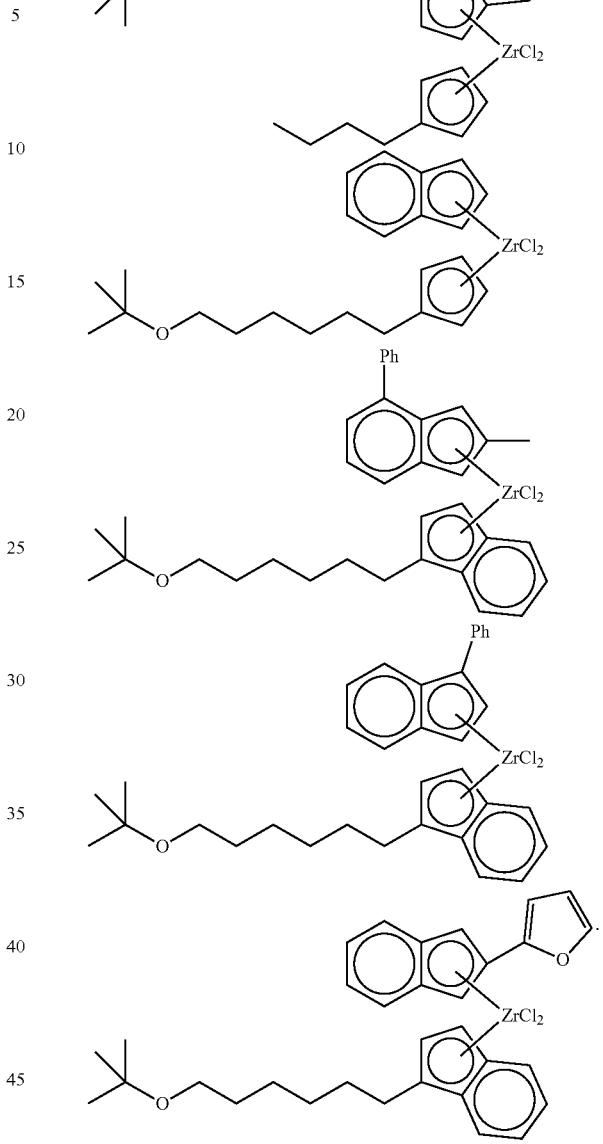

Further, the first transition metal compound may be a compound in which $M_1$ is Zr; $Cp^1$ and $Cp^1$ are each independently an unsubstituted cyclopentadienyl group or a cyclopentadienyl group substituted with at least one $C_{1-10}$ alkyl such as methyl; $R_{11}$ and $R_{12}$ are each independently hydrogen, $C_{1-20}$ alkyl, $C_{2-20}$ alkoxyalkyl, $C_{7-20}$ aryl, or $C_{7-20}$ arylalkyl, wherein at least one or both of $R_{11}$ and $R_{12}$ are $C_{2-20}$ alkoxyalkyl, more specifically $C_{2-10}$ alkoxyalkyl, and even more specifically t-butoxyhexyl; $Z_1$ is a halogen group; and m is 1 in Chemical Formula 1.

The first transition metal compound represented by Chemical Formula 1 may be synthesized by applying known reactions. Specifically, a ligand compound is prepared by various synthesis processes, and then metallation is performed by adding a metal precursor compound. However, the present disclosure is not limited thereto, and the synthesis method can be referred to Examples.

Meanwhile, in the hybrid supported catalyst, the second transition metal compound represented by the Chemical Formula 2 forms a ligand structure in which an indene derivative and an amine derivative are cross-linked by a bridge compound, and has a pair of non-covalent electrons capable of acting as a Lewis base in the ligand structure, thereby exhibiting high polymerization activity. Particularly, the catalyst may exhibit high catalytic activity by having the indene structure which is structurally stable and electronically rich, and may exhibit excellent supporting stability for a support by including a tether group in the bridge group.

In addition, the second transition metal compound is substituted with a functional group ($R_{22}$) having a branched structure at position 2 of the indene structure, and beta-hydrogen in the polymer chain in which the nitrogen atom of the amine derivative grows is stabilized by hydrogen bonding, thereby preparing polymers with the medium and high molecular weight. In addition, the polymer to be prepared has a narrow molecular weight distribution, thereby exhibiting excellent mechanical properties. Specifically, $R_{22}$ may be a $C_{3-12}$ or $C_{3-6}$ branched alkyl such as isopropyl, isobutyl, t-butyl, isopentyl, and the like, and may be isopropyl, which is more advantageous in terms of steric effects.

In addition, the indene structure has an inductive effect capable of supplying sufficient electrons by bonding $R_{21}$, specifically $C_{6-20}$ aryl substituted with one or more, or one or two $C_{1-20}$ alkyl, at position 4, thereby exhibiting higher catalytic activity. More specifically, in Chemical Formula 2, $R_{21}$ may be phenyl substituted with one or two $C_{3-6}$ branched alkyl such as 4-tert-butyl phenyl and 3,5-ditert-butyl phenyl.

In addition, $R_{23}$ bonded to N in Chemical Formula 2 may be $C_{1-20}$ linear or branched alkyl, and more specifically, $C_{3-12}$ or $C_{3-6}$ branched alkyl such as t-butyl. When $R_{23}$ has a branched structure, the transition metal compound is sterically stabilized, and the catalyst is stabilized through an electron supply effect, thereby exhibiting higher catalytic activity.

More specifically, in Chemical Formula 2, $R_{21}$ is phenyl substituted with one or two $C_{3-6}$ branched alkyl, and $R_{22}$ and $R_{23}$ may each independently be $C_{3-6}$ branched alkyl. Even more specifically, $R_{22}$ may be isopropyl.

In addition, in Chemical Formula 2, the bridge group includes a tether group of —($CH_2$)n-O—$R_{25}$ capable of tethering to the support together with the functional group of $R_{24}$. Accordingly, it is possible to exhibit excellent supporting stability, and to maintain excellent catalytic activity to prepare a polymer having a high molecular weight.

Specifically, $R_{24}$ may be $C_{1-10}$ or $C_{1-6}$ linear or branched alkyl. More specifically, it may be $C_{1-4}$ linear alkyl or methyl to increase solubility, resulting in improved supporting efficiency.

In addition, $R_{25}$ in the tether group may be $C_{1-12}$ or $C_{1-6}$ linear or branched alkyl, and more specifically, it may be $C_{3-6}$ branched alkyl or t-butyl. When the tether group has a branched structure such as t-butyl, it can be easily detached and bonded to the support, thereby exhibiting excellent supporting stability.

In addition, n in the tether group may specifically be 3 to 8, or 4 to 6, and the tether group within the above range may have an appropriate length and thus stably exhibit catalytic activity with excellent supporting stability.

In the bridge group, A may be silicon (Si).

More specifically, in Chemical Formula 2, A is silicon, $R_{25}$ is $C_{3-6}$ branched alkyl, and n may be an integer of 4 to 6.

In addition, the second transition metal compound of Chemical Formula 2 may include a transition metal of Group 4 such as titanium (Ti), zirconium (Zr), and hafnium (Hf) as the central metal ($M_2$). When the transition metal compound contains Ti as the central metal, the catalyst exhibits more excellent polymerization activity by increasing structural openness than the case of containing other Transition metal of Group 4s such as Zr and Hf and is stabilized by the effect of supplying electrons to produce a polymer having a high molecular weight.

In Chemical Formula 2, $Z_{21}$ and $Z_{22}$ may each independently be halogen such as chloro; or $C_{1-4}$ alkyl such as methyl. More specifically, both $Z_{21}$ and $Z_{22}$ may be methyl, and in this case, better catalytic activity may be exhibited than the case where $Z_{21}$ and $Z_{22}$ are halogen.

More specifically, in Chemical Formula 2, $M_2$ is titanium, and $Z_{21}$ and $Z_{22}$ may each independently be $C_{1-4}$ alkyl.

More specifically, the compound of Chemical Formula 2 may be a compound in which A is silicon; $M_2$ is titanium; $R_{21}$ is phenyl substituted with one or two $C_{3-10}$ branched alkyl such as t-butyl; $R_{22}$ is $C_{3-6}$ branched alkyl such as isopropyl; $R_{23}$ is $C_{3-6}$ branched alkyl such as t-butyl; $R_{24}$ is $C_{1-4}$ linear alkyl such as methyl; $R_{25}$ is $C_{3-6}$ branched alkyl such as t-butyl; $Z_{21}$ and $Z_{22}$ are each independently $C_{1-4}$ alkyl such as methyl; and n is an integer of 4 to 6.

The second transition metal compound represented by the Chemical Formula 2 may be a compound represented by one of the following structural formulae, but is not limited thereto:

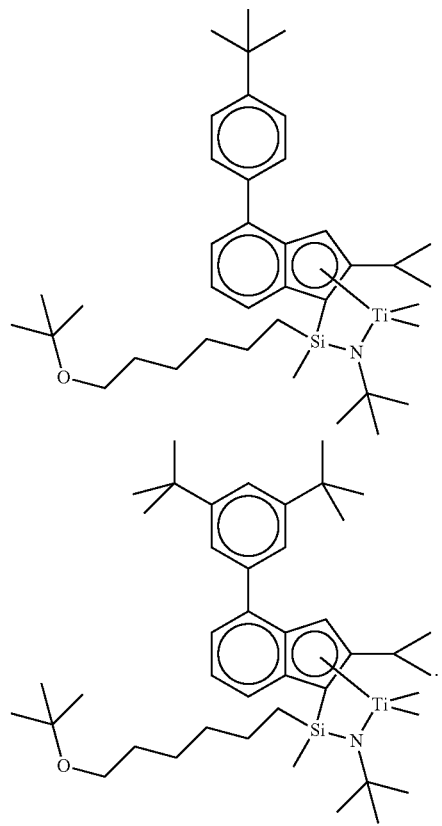

The second transition metal compound described above may be prepared by lithiation of a ligand compound of the following Chemical Formula 3, followed by reacting with a halide containing a transition metal of Group 4:

[Chemical Formula 3]

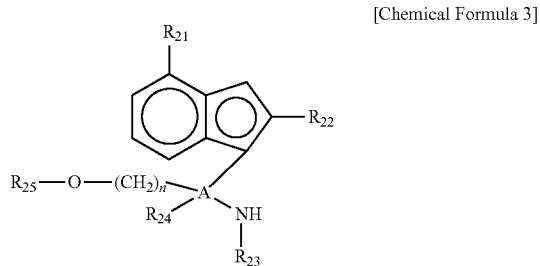

In Chemical Formula 3, A, $R_{21}$ to $R_{25}$, and n are the same as defined above.

The following Reaction Scheme 1 represents a process of preparing the second transition metal compound of Chemical Formula 2 according to one embodiment of the present invention. The following Reaction Scheme 1 is only an example for explaining the present invention, but the present invention is not limited thereto:

[Reaction Scheme 1]

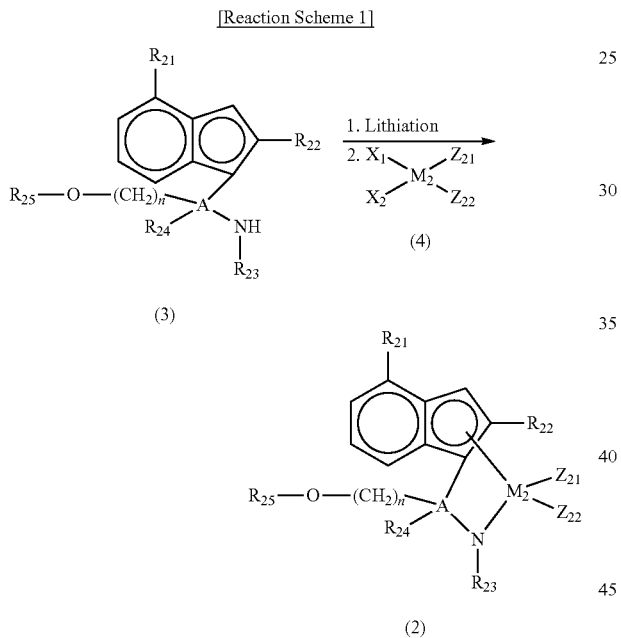

In Reaction Scheme 1, A, $M_2$, $R_{21}$ to $R_{25}$, $Z_{21}$, $Z_{22}$ and n are the same as defined above, and $X_1$ and $X_2$ are each independently halogen.

As in Reaction Scheme 1, a compound (2) of Chemical Formula 2 may be prepared by reacting a ligand compound (3) of Chemical Formula 3 with alkyl lithium such as n-butyllithium (NBL) for lithiation, and then reacting with a transition metal of Group 4-containing halide (4) such as $TiCl_4$. In addition, when each of $Z_{21}$ and $Z_{22}$ in the compound (2) of Chemical Formula 2 is $C_{1-10}$ alkyl, an alkylating agent for alkylation of metal M, such as MMB (Methyl Magnesium Bromide), may be additionally added after the lithiation.

In addition, the ligand compound (3) used in the preparation of the compound (2) of Chemical Formula 2 may be prepared by a synthesis process as in Reaction Scheme 2 below. The Reaction Scheme 2 is only an example for explaining the present invention, and the present invention is not limited thereto.

[Reaction Scheme 2]

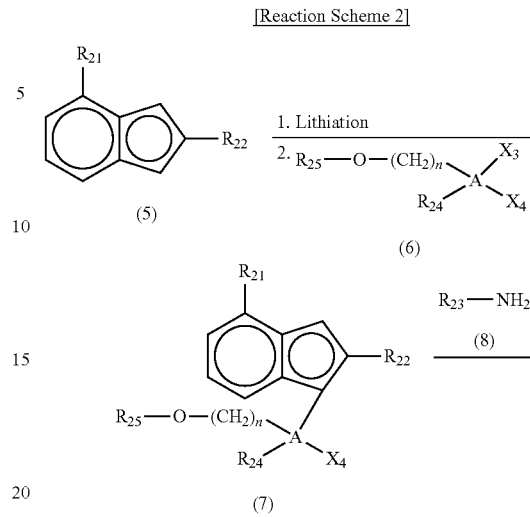

In Reaction Scheme 2, A, $R_{21}$ to $R_{24}$, and n are the same as defined above, and $X_3$ and $X_4$ are each independently halogen.

Referring to Reaction Scheme 2, the ligand compound (3) may be prepared including the steps of reacting an indene-based compound (5) as a Cp unit with alkyl lithium such as n-butyllithium (NBL) to perform lithiation; reacting the resulting reactant with a raw material (6) for providing a tether group to prepare a compound (7) in which a tether group is bonded to an indene structure; and reacting the compound (7) with a primary amine (8) having a substituent of $R_3$ such as $t$-$BuNH_2$.

The reaction in each step may be performed by applying known reactions, and a more detailed synthesis method may be referred to Preparation Examples to be described later.

As described above, the hybrid supported catalyst including the first and second transition metal compounds may effectively provide a polyolefin, in particular, a high-density polyethylene capable of improving tensile strength due to an increase in the degree of cross-linking when preparing a chlorinated polyolefin and a chlorinated compound, because the polyolefin has a minimized low molecular weight content and a broad molecular weight distribution by forming a high molecular weight tail in the molecular weight distribution curve. In addition, the above-described effect may be further enhanced by controlling a mixing ratio of the first and second transition metal compounds in the hybrid supported catalyst. Specifically, the mixing molar ratio of the first and second transition metal compounds may be 1:3 to 3:1, or 1:1.5 to 2:1.

Further, the catalytic activity may be increased, and physical properties of the prepared polyethylene may be further improved by optimizing the mixing ratio according to the combination of the first and second transition metal compounds. For example, in Chemical Formula 2 of the second transition metal compound, when $R_{21}$ is phenyl substituted with one of $C_{3-10}$ branched alkyl, the first transition metal compound and the second transition metal compound are preferably included at a weight ratio of 1:1.1 to 1:3, or 1:1.2 to 1:1.5, and in Chemical Formula 2 of the second transition metal compound, when $R_{21}$ is phenyl substituted with two or more of $C_{3-10}$ branched alkyl, the first transition metal compound and the second transition metal compound are preferably included at a weight ratio of 1:1 to 3:1, or 1.5:1 to 2:1.

In addition, in the hybrid supported catalyst, the first and second transition metal compounds are included in the form of a supported catalyst supported on a support. When the transition metal compounds are used in the form of a supported catalyst, it is possible to further improve morphology and physical properties of the polyethylene to be prepared, and it may be suitably used for slurry polymerization, bulk polymerization, and gas phase polymerization.

Specifically, the support may include silica, alumina, magnesia, or a mixture thereof. Further, supports having a highly reactive hydroxyl group, silanol group, or siloxane group on the surface thereof are preferred. To this end, supports surface-modified by calcination, or supports in which moisture is removed from the surface thereof by drying may be used. For example, silica prepared by calcination of silica gel, silica dried at a high temperature, silica-alumina, and silica-magnesia may be used. In addition, the supports may include oxides, carbonates, sulfates, and nitrates, such as $Na_2O$, $K_2CO_3$, $BaSO_4$, and $Mg(NO_3)_2$, etc.

The support is preferably calcined or dried at 200 to 600° C., more preferably 250 to 600° C. When the temperature is less than 200° C., the support contains too much moisture, so that the moisture on the surface may react with the cocatalyst. In addition, a cocatalyst supporting ratio may be relatively high due to excess hydroxyl groups, but this requires a large amount of cocatalyst. When the temperature is higher than 600° C., pores on the surface of the support may be combined with each other to reduce surface area, and many hydroxyl groups or silanol groups may be lost from the surface, leaving only siloxane groups. Thus, reactive sites with cocatalyst may be reduced, which is not preferable.

The amount of hydroxyl groups may be controlled by the preparation method, the preparation conditions, or the drying conditions such as temperature, time, vacuum or spray drying of the support. When the amount of hydroxyl groups is excessively low, reactive sites with cocatalyst may be insufficient. When the amount of hydroxyl groups is excessively high, it may be caused by moisture besides the hydroxyl groups present on the surface of support particles, which is not desirable. For example, the amount of hydroxyl groups on the surface may be 0.1 to 10 mmol/g, or 0.5 to 5 mmol/g.

Among the above-mentioned supports, the silica prepared by calcining silica, particularly silica gel, has little catalyst released from the surface of the support in the polymerization process of the propylene, because the transition metal compound is chemically bonded to and supported on the silica support. As a result, when the polyolefin is prepared by slurry polymerization or gas phase polymerization, a fouling phenomenon, sticking to the wall surface of the reactor or with each other, may be minimized.

When the transition metal compounds are used in the form of a supported catalyst, the content of the first and second transition metal compounds may be 10 µmol or more, 30 µmol or more or 60 µmol or more, and 120 µmol or less, or 100 µmol or less based on a weight of the support, for example, 1 g of silica. When supported within the above content range, the supported catalyst may exhibit appropriate activity, which is advantageous in terms of maintaining catalytic activity.

The hybrid supported catalyst having the above-described configuration exhibits excellent polymerization activity, and a polyolefin having a structure optimized to improve tensile strength of a chlorinated polyolefin or a chlorinated compound can be prepared.

Preparation of Polyolefin

According to another embodiment of the present invention, provided is a method of preparing a polyolefin, the method including the step of polymerizing an olefin monomer in the presence of a catalyst composition including the above-described hybrid supported catalyst.

In the preparation method, the catalyst composition includes the above-described hybrid supported catalyst.

The hybrid supported catalyst may itself be introduced into the polymerization system, or may be dissolved or diluted in a $C_{5-12}$ aliphatic hydrocarbon solvent such as pentane, hexane, heptane, nonane, decane and an isomer thereof, in an aromatic hydrocarbon solvent such as toluene and benzene, or in a hydrocarbon solvent substituted with chlorine such as dichloromethane and chlorobenzene, and then introduced into the polymerization system. The solvent used herein is preferably used after removing a small amount of water or air, which acts as a catalyst poison, by treating with a small amount of alkyl aluminum.

The catalyst composition may further include one or more of a cocatalyst and an antistatic agent.

Specifically, the catalyst composition may further include a cocatalyst in terms of improving activity and process stability. The cocatalyst may include one or more of compounds represented by the following Chemical Formula 9, Chemical Formula 10, and Chemical Formula 11:

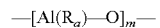 [Chemical Formula 9]

in Chemical Formula 9, $R_a$'s may be the same as or different from each other, and each independently, halogen; $C_{1-20}$ hydrocarbon; or halogen-substituted $C_{1-20}$ hydrocarbon; and m is an integer of 2 or more;

 [Chemical Formula 10]

in Chemical Formula 10, $R_b$'s may be the same as or different from each other, and each independently, halogen; $C_{1-20}$ hydrocarbon; or halogen-substituted $C_{1-20}$ hydrocarbon; and J is aluminum or boron;

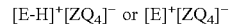 [Chemical Formula 11]

in Chemical Formula 11,

E is a neutral or cationic Lewis base;

H is a hydrogen atom;

Z is an element of Group 13; and

Q's may be the same as or different from each other, and each independently, a $C_{6-20}$ aryl or $C_{1-20}$ alkyl group, of which one or more hydrogen atoms are unsubstituted or substituted with halogen, $C_{1-20}$ hydrocarbon, alkoxy, or phenoxy.

Examples of the compound represented by Chemical Formula 9 may include $C_{1-20}$ alkylaluminoxane-based compounds, such as methylaluminoxane, ethylaluminoxane, isobutylaluminoxane, butylaluminoxane, etc., and among them, any one thereof or a mixture of two or more thereof may be used.

Further, examples of the compound represented by Chemical Formula 10 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyl dimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like, and more specifically, it may be selected from trimethylaluminum, triethylaluminum, and triisobutylaluminum.

Further, examples of the compound represented by Chemical Formula 11 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentatetraphenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenylcarboniumtetra(p-trifluoromethylphenyl) boron, triphenylcarboniumtetrapentafluorophenylboron, or the like, and among them, any one thereof or a mixture of two or more thereof may be used.

Among the above-described cocatalysts, the cocatalyst may be the compound represented by Chemical Formula 9, and more specifically, a $C_{1-20}$ alkylaluminoxane-based compound such as methylaluminoxane, etc., considering that the cocatalyst may exhibit more excellent catalytic activity when used with the transition metal compound. The alkylaluminoxane-based compound acts as a scavenger of hydroxyl groups present on the support surface to improve catalytic activity, and converts the halogen group of the catalyst precursor into a methyl group to promote chain growth during polymerization of polyethylene.

The cocatalyst may be supported in an amount of 0.1 mmol or more, or 0.15 mmol or more, or 5 mmol or more, or 8 mmol or more, or 10 mmol or more, and 25 mmol or less, or 20 mmol or less, based on the weight of the support, e.g., 1 g of silica. When the cocatalyst is included in the above content range, it is possible to sufficiently obtain the effect of improving the catalytic activity due to use of the cocatalyst and the effect of reducing the generation of fines.

In addition, the catalyst composition may further include an antistatic agent. As the antistatic agent, ethoxylated alkylamine, specifically, a compound represented by the following Chemical Formula 12 may be used. When the catalyst composition includes the antistatic agent, generation of static electricity is suppressed during the polyethylene polymerization process, thereby further improving the physical properties of the prepared polyethylene.

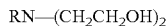  [Chemical Formula 12]

in Chemical Formula 12, R may be $C_{8-30}$ alkyl, and when R includes an alkyl group having the number of carbon in the above range, it may exhibit the effect of reducing fines through an excellent antistatic action without causing an unpleasant odor.

More specifically, the ethoxylated alkylamine may be a compound having Chemical Formula 12, wherein R is $C_{8-22}$ linear alkyl, or $C_{10-18}$ linear alkyl, or $C_{13-15}$ linear alkyl, and these compounds may be used alone or in a mixture of two or more thereof. Specific examples thereof may include N,N-bis(2-hydroxyethyl)tridecylamine, or N,N-bis(2-hydroxyethyl)pentadecylamine, etc., and commercially available Atmer 163™ (available from CRODA) may be used.

When the antistatic agent is further included, it may be included in an amount of 0.5 parts by weight or more, 1 part by weight or more, or 2 parts by weight or more, and 20 parts by weight or less, 10 parts by weight or less, or 7 parts by weight or less, based on 100 parts by weight of the support, e.g., silica.

The above-described cocatalyst and antistatic agent may be used in combination with the above-described hybrid supported catalyst, respectively, or may be used in a state of being supported on the support in the hybrid supported catalyst. When they are used in a state of being supported on the support in the hybrid supported catalyst, the catalyst composition may be prepared by a preparation method including the steps of supporting the cocatalyst compound on the support, and supporting the transition metal compound on the support; and introducing the antistatic agent in a slurry state into the support on which the cocatalyst and the transition metal compounds are supported, followed by heat treatment. In this regard, the supporting of the transition metal compound may be performed by supporting the first transition metal compound and then supporting the second transition metal compound, or vice versa. The supported catalyst having a structure determined according to such a supporting order may exhibit a higher catalytic activity and excellent process stability in the polyolefin preparation process.

The catalyst composition may be used in the form of a slurry or a dilution in a solvent according to a polymerization method, or may be used in the form of a mud catalyst mixed with a mixture of oil and grease.

When the catalyst composition is used in the form of a slurry or a dilution in a solvent, the solvent is an aliphatic hydrocarbon solvent having 5 to 12 carbon atoms suitable for the polymerization process of propylene monomer, such as pentane, hexane, heptane, nonane, decane, and isomers thereof, and aromatic hydrocarbon solvents such as toluene and benzene, or chlorine atom-substituted hydrocarbon solvents, such as dichloromethane and chlorobenzene, or the like, and any one or a mixture of two or more thereof may be used. In this case, the catalyst composition may further include the above solvent, and a small amount of water or air, which may act as a catalyst poison, may be removed by treating the solvent with a small quantity of alkylaluminum before use.

In addition, when a polymerization method such as continuous bulk polymerization is used, the catalyst composition may be used in the form of a mud catalyst mixed with a mixture of oil and grease. In this case, as compared with the case of using the catalyst composition in the form of being dissolved or diluted in a solvent, the amount of volatile organic compounds contained in the prepared homopolyethylene may be further reduced, and as a result, odors caused by volatile organic compounds may also be reduced.

On the other hand, the polymerization reaction for the preparation of polyolefin may be performed by homopolymerization of one kind of olefin monomer or copolymerization of two or more kinds of monomers in one continuous slurry polymerization reactor, loop slurry reactor, gas-phase reactor, or solution reactor. However, according to the method of one embodiment, the olefin monomer is more preferably polymerized by slurry polymerization or gas-phase polymerization, in order to more effectively control the molecular weight distribution.

In particular, the polymerization reaction may be performed by a slurry phase polymerization in a hydrocarbon-based solvent (for example, an aliphatic hydrocarbon-based solvent such as hexane, butane, or pentane). As the first and second transition metal compounds according to the present disclosure have excellent solubility in aliphatic hydrocarbon-based solvents, they are stably dissolved and supplied to the reaction system, and thus the polymerization reaction can be effectively performed.

Further, the method of preparing a polyolefin according to one embodiment of the present invention may be carried out in a single-CSTR reactor.

In the polymerization reactor, the polymerization may be carried out, for example, in the presence of an inert gas such as nitrogen. The inert gas may play a role in prolonging the reaction activity of the metallocene compound included in the catalyst by suppressing the rapid reaction of the metallocene catalyst at the beginning of the polymerization reaction.

In addition, during the polymerization reaction, hydrogen gas may be used for the purpose of controlling the molecular weight and the molecular weight distribution of polyolefin. Hydrogen gas activates the inert site of the metallocene catalyst, and controls the molecular weight by causing a chain transfer reaction. When hydrogen gas is further added during the polymerization reaction, it may be added in an amount corresponding to 0.1% by volume or more, 0.12% by volume or more, and 0.2% by volume or less, and 0.18% by volume or less, based on the total volume of the olefin monomer. When hydrogen gas is added in an amount within the above range, the molecular weight of the prepared polymer is reduced, thereby improving processability.

In addition, the temperature during the polymerization reaction may be 70° C. to 100° C., or 80° C. to 90° C. When the polymerization temperature is too low, it is not preferred in terms of the polymerization rate and productivity. On the contrary, when the polymerization temperature is higher than necessary, fouling in the reactor may be caused.

In addition, the pressure during the polymerization reaction may be 6.8 kg/cm$^2$ to 9 kg/cm$^2$, more specifically 6.8 kg/cm$^2$ or more, or 7.0 kg/cm$^2$ or more, or 8.0 kg/cm$^2$ or more, and 9 kg/cm$^2$ or less or 8.7 kg/cm$^2$ or less. The polymerization pressure may be 6.8 kg/cm$^2$ or more in terms of preventing blocking due to excessive generation of high-molecular-weight polymers and optimizing productivity, and may be 9 kg/cm$^2$ or less in consideration of prevention of side reactions under high pressure polymerization conditions.

In addition, an organic solvent may be further used as a reaction medium or diluent in the polymerization reaction. Such an organic solvent may be used in an amount sufficient to properly perform a slurry-phase polymerization, etc. in consideration of the content of the olefin monomer.

In addition, trialkylaluminum such as triethylaluminum may be optionally added during the polymerization reaction. When moisture or impurity is present in the polymerization reactor, a part of the catalyst is decomposed. The trialkylaluminum acts as a scavenger to capture moisture or impurities in the reactor or moisture contained in the monomer in advance. Thus, activity of the catalyst used in the preparation may be maximized, and as a result, a homopolyethylene having excellent physical properties, particularly, a narrow molecular weight distribution may be more efficiently prepared. Specifically, in the trialkylaluminum, alkyl is as defined above, specifically, $C_{1-20}$ alkyl, and more specifically, $C_{1-6}$ linear or branched alkyl such as methyl, ethyl, isobutyl, or the like.

In addition, the trialkylaluminum (based on 1 M) may be added in an amount of 300 ppm or more, or 400 ppm or more, and 1500 ppm or less, or 1350 ppm or less, based on the total weight of the ethylene monomer. When the polymerization reaction is performed in the presence of trialkylaluminum in this content range, a homopolyethylene having excellent strength characteristics may be more easily prepared.

In addition, the olefin monomer may be ethylene, alpha-olefin, cyclic olefin, diene olefin or triene olefin having two or more double bonds.

Specific examples of the olefin monomer may include ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicosene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene, 3-chloromethylstyrene, or the like, and copolymerization may be performed by mixing two or more of the monomers.

The polyolefin prepared by the above preparation method exhibits a multimodal molecular weight distribution when analyzed by gel permeation chromatography (GPC), and has a broad molecular weight distribution with a minimized low molecular content. In the molecular weight distribution curve by gel permeation chromatography analysis of the polyolefin, an area ratio occupied by an area of log Mw of 3.5 or less relative to the total area of the distribution curve is 1.4% or less, and a molecular weight distribution is 6 to 15.

Specifically, with regard to the polyolefin, an area ratio, i.e., a fraction occupied by the area of log Mw of 3.5 or less (log Mw≤3.5) relative to the total area is 1.4% or less, or 1.2% or less, or 1.05% or less, or 1% or less, when a molecular weight distribution curve is obtained by plotting the log value (log Mw) of the weight average molecular weight (Mw) on the x-axis, and the molecular weight distribution (dwt/d log Mw) with respect to the log value on the y-axis. The area ratio occupied by the area of log Mw of 3.5 or less means the low molecular content having a weight average molecular weight (Mw) of $10^{3.5}$ g/mol or less in the polyolefin. In the polyolefin prepared by using the hybrid supported catalyst according to the present invention, the low molecular content may be minimized as described above, thereby achieving excellent crosslinking property.

However, as the low molecular content in the polyolefin is smaller, it is more advantageous in terms of the degree of crosslinking. However, when the low molecular content is too low and the high molecular content is relatively too high, it is apprehended that processability may decrease due to the increase in Mooney viscosity during preparation of the chlorinated polyethylene compound. Accordingly, taking into consideration the appropriate Mooney viscosity and processability improvement during manufacturing of cables using chlorinated polyethylene, the fraction of the area of log Mw of 3.5 or less may be 0.1% or more, 0.5% or more, or 0.8% or more.

The polyolefin has a broad molecular weight distribution (PDI) according to formation of a high molecular weight tail in the molecular weight distribution curve, together with the minimized low molecular content. Specifically, PDI of the polyolefin is 6 or more, or 6.1 or more, and 15 or less, or 12 or less.

Meanwhile, in the present invention, the molecular weight distribution (PDI, polydispersity index) of polyolefin may be determined by measuring a weight average molecular weight (Mw) and a number average molecular weight (Mn) of the polyolefin, and then dividing the weight average molecular weight by the number average molecular weight.

Further, the low molecular content in the polyolefin, the weight average molecular weight, and the number average molecular weight may be measured by gel permeation chromatography (GPC, manufactured by Water) analysis, and a specific measurement method is the same as described in Experimental Example below.

Further, the polyolefin may satisfy one or more, two or more, or all of the following (i) to (viii) conditions, in addition to the above-described low molecular content and molecular weight distribution characteristics:

(i) a fraction at log Mw of more than 3.5 and 4.0 or less (3.5<log Mw≤4.0) in a molecular weight distribution curve according to GPC analysis: 1% to 5%, (ii) a fraction at log Mw of 4.0 or less in the molecular weight distribution curve according to GPC analysis: 6% or less, (iii) a weight average molecular weight: 185,000 g/mol to 500,000 g/mol, (iv) a complex viscosity, as measured at a frequency of 500 rad/s: 790 Pa·s to 810 Pa·s, (v) a melt flow rate ratio (MFRR, $MI_{21.6}/MI_5$): 10 to 25, (vi) a melt index ($MI_{5.0}$, condition E, 190° C., under a load of 5.0 kg): 0.5 g/10 min to 3 g/10 min, (vii) a density, as measured according to ASTM D-1505: 0.94 g/cm$^3$ to 0.96 g/cm$^3$, and (viii) MDR torque ($M_H$-$M_L$): 7.5 Nm to 12 Nm.

Specifically, in the polyolefin, the fraction at log Mw of more than 3.5 and 4.0 or less (3.5<log Mw≤4.0), which reduces crosslinking efficiency, i.e., the low molecular content of the weight average molecular weight (Mw) of more than $10^{3.5}$ g/mol and $10^{4.0}$ g/mol or less, may be 5% or less, or 4.8% or less, or 4.5% or less, and 1% or more, or 3% or more, and the fraction at log Mw of 4.0 or less, i.e., the low molecular content of the weight average molecular weight (Mw) of $10^{4.0}$ g/mol or less, may be 6% or less, and more specifically 5.5% or less.

In a polyolefin, when the low molecular content, in particular, the low molecular content of Mw of $10^{4.0}$ g/mol or less is high, the low molecular component is melted, and thus fluidity increases, which may block the pores of the polyolefin particles and reduce the chlorination productivity.

In contrast, the above-described polyolefin may exhibit excellent effect of improving the degree of crosslinking without concern about reduction in chlorination productivity.

Further, the polyolefin has a high weight average molecular weight (Mw), specifically, Mw of 185,000 g/mol or more, or 190,000 g/mol or more, and 500,000 g/mol or less, or 350,000 g/mol or less. When the polyolefin has the above range of Mw and PDI, it may exhibit a good balance between excellent mechanical properties and improved processability. In particular, polyolefins after chlorination exhibit no great difference in the molecular weight, and thus chlorine may be uniformly substituted.

Further, the polyolefin has a complex viscosity ($\eta^*$ ($\omega$500)) of 790 Pa·s or more and 810 Pa·s or less, as measured at a frequency ($\omega$) of 500 rad/s, and thus it is suitable for preparing a chlorinated polyolefin for wires or cables.

In the present invention, the complex viscosity of the polyolefin may be measured at a temperature of 190° C. and a frequency ($\omega$) of 0.05 rad/s using an ARES (Advanced Rheometric Expansion System), and a specific measurement method thereof is the same as described in Experimental Example below.

Further, the polyolefin has a melt flow rate ratio (MFRR, $MI_{21.6}/MI_5$) of 25 or less, or 20 or less, or 18 or less, and 10 or more, or 10.3 or more, and a melt index ($MI_{5.0}$, condition E, 190° C., under a load of 5.0 kg) of 0.5 g/10 min or more, 0.8 g/10 min or more, or 1 g/10 min or more, and 3 g/10 min or less, or 2.5 g/10 min or less. When the polyolefin has the above range of the melt flow rate ratio and the melt index, it is possible to appropriately control the Mooney viscosity without deteriorating physical properties during preparation of a chlorinated polyolefin, thereby improving processability.

In the present invention, the melt index ($MI_{5.0}$) of the polyolefin may be measured according to ASTM D1238 (condition E, 190° C., under a load of 5.0 kg). Further, the melt flow rate ratio (MFRR, 21.6/5) may be calculated by dividing $MFR_{21.6}$ by $MFR_5$, and the $MFR_{21.6}$ may be measured at a temperature of 190° C. under a load of 21.6 kg according to ASTM D 1238, and the $MFR_5$ may be measured at a temperature of 190° C. under a load of 5 kg according to ASTM D 1238.

Further, the polyolefin exhibits a high density of 0.94 g/cm$^3$ or more, or 0.945 g/cm$^3$ or more, and 0.96 g/cm$^3$ or less, or 0.955 g/cm$^3$ or less. This means that the polyolefin has the high content of the crystal structure and is dense, indicating that the crystal structure hardly changes during the chlorination process. In the present invention, the density of polyolefin may be measured by a method according to ASTM D-1505.

Further, the polyolefin exhibits MDR torque ($M_H$-$M_L$) of 7.5 Nm or more, or 8 Nm or more or 8.5 Nm or more, and or 12 Nm or less, or 11.5 Nm or less. When the polyolefin has the above range of MDR torque, it may exhibit high degree of crosslinking and excellent mechanical properties.

The MDR torque ($M_H$-$M_L$) of the polyolefin refers to the degree of crosslinking. The high degree of crosslinking means high $M_H$-$M_L$ and excellent crosslinking efficiency when the same crosslinking agent is applied. The MDR torque of the polyolefin may be measured by using, for example, a MDR (Moving die rheometer), and may be determined by measuring $M_H$ value and $M_L$ value under conditions of 180° C. and 10 min, and then subtracting the $M_L$ value from the $M_H$ value. Here, $M_H$ represents a maximum vulcanizing torque measured at a full cure, and $M_L$ represents a minimum vulcanizing torque. A specific measurement method thereof is the same as described in Experimental Example below.

The polyolefin may be an olefin homopolymer including no comonomer, e.g., an ethylene homopolymer. For example, when the polyolefin is, e.g., an ethylene homopolymer, preferably, a high-density polyethylene (HDPE) that satisfies the above-described density condition, the above-described physical properties may be more appropriately satisfied. The high-density polyethylene has excellent softening point, rigidity, strength, and electrical insulation, and thus may be used in various containers, packaging films, fibers, pipes, packings, insulating materials or the like.

As described above, the polyolefin prepared by using the hybrid supported catalyst according to the present invention has an optimized molecular structure such as a broad molecular weight distribution together with a minimized low molecular content. Thus, the degree of crosslinking may be increased during preparation of a chlorinated polyolefin, and as a result, the tensile strength may be greatly improved. Accordingly, the polyolefin may be particularly useful in preparing a chlorinated polyolefin for wires or cables.

According to another embodiment of the present invention, provided is a method of preparing a chlorinated polyolefin, the method including the step of chlorinating the polyolefin prepared by the above-described method by treatment with chlorine.

Advantageous Effects

A hybrid supported catalyst according to the present invention includes two or more kinds of transition metal compounds having specific chemical structures, thereby preparing a polyolefin, particularly, a high-density polyethylene having a molecular structure which is optimized to improve tensile strength of a chlorinated polyolefin compound.

DETAILED DESCRIPTION OF THE EMBODIMENTS

The present invention will be described in more detail with reference to the following exemplary embodiments. However, these exemplary embodiments are for illustrative purposes only, and the scope of the present invention is not intended to be limited by the following exemplary embodiments.

Preparation of First Transition Metal Compound

Synthesis Example 1: Preparation of [tert-Bu-O—(CH$_2$)$_6$—C$_5$H$_4$]$_2$ZrCl$_2$ tert-Butyl-O—(CH$_2$)$_6$—Cl was prepared by the method shown in Tetrahedron Lett. 2951 (1988) using 6-chlorohexanol, and reacted with NaCp to obtain tert-Butyl-O—(CH$_2$)$_6$—C$_5$H$_5$ (yield 60%, b.p. 80° C./0.1 mmHg).

In addition, tert-Butyl-O—(CH$_2$)$_6$—C$_5$H$_5$ was dissolved in THF at −78° C., and normal butyllithium (n-BuLi) was slowly added thereto. Thereafter, it was heated to room temperature and reacted for 8 hours. The lithium salt solution synthesized as described above was slowly added to a suspension solution of ZrCl$_4$(THF)$_2$ (1.70 g, 4.50 mmol)/THF (30 mL) at −78° C., and further reacted for about 6 hours at room temperature.

All volatiles were dried in vacuum and the resulting oily liquid material was filtered by adding a hexane solvent. The filtered solution was dried in vacuum, and hexane was added to obtain a precipitate at a low temperature (−20° C.). The obtained precipitate was filtered at a low temperature to obtain [tert-Bu-O—(CH$_2$)$_6$—C$_5$H$_4$]$_2$ZrCl$_2$ in the form of a white solid (yield 92%).

$^1$H NMR (300 MHz, CDCl$_3$): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

$^{13}$C NMR (CDCl$_3$): 135.09, 116.66, 112.28, 72.42, 61.52, 30.66, 30.61, 30.14, 29.18, 27.58, 26.00.

Preparation of Second Transition Metal Compound

Synthesis Example 2-1

Step 1: Preparation of Ligand Compound

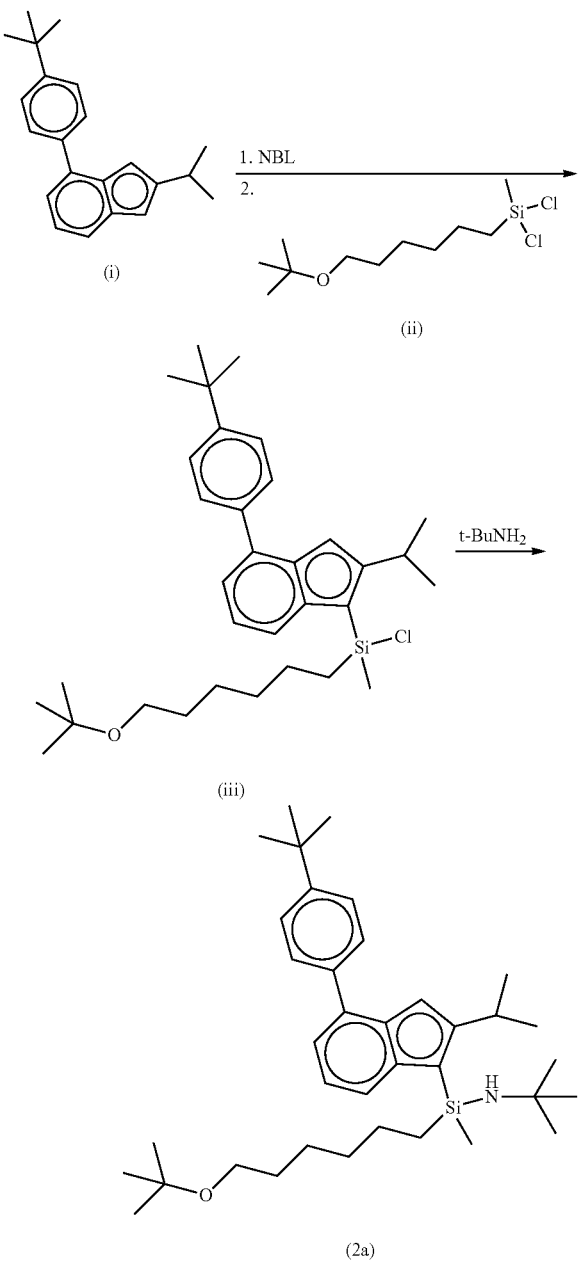

4-(4-(tert-butyl)phenyl)-2-isopropyl-1H-indene (i) (2.9 g, 10 mmol) as a Cp unit was put in a 100 mL schlenk flask, and tetrahydrofuran (THF; 35 ml) was added thereto, and cooled to −20° C. or lower. The cooled mixed solution was stirred for 5 min, and then N-butyllithium (NBL; 4.2 ml, 2.5 M in hexane) was added thereto, and allowed to react overnight to prepare lithiated Cp. When the n-butyllithium was added, the mixed solution had a brown color.

Dichloro(tert-butoxy)hexyl)methylsilane (ii) (2.84 g) as a tether silane was put in another 100 ml schlenk flask, and MTBE (methyl tert-butyl ether) (35 ml) was added thereto. The schlenk flask was cooled to −20° C. or lower, and then the prepared lithiated Cp was added dropwise and allowed to react. When the reaction was completed, the solvent in the reaction product was removed by distillation under vacuum, and the resulting salt was removed by filtration using hexane (Hex). t-BuNH$_2$ (4.5 ml) was added to the resulting reaction product (iii) and allowed to react, and then the resulting precipitate was removed by filtration using hexane to obtain a ligand compound (2a) of 1-(6-(tert-butoxy)hexyl)-N-(tert-butyl)-1-(4-(4-(tert-butyl)phenyl)-2-isopropyl-1H-inden-1-yl)-1-methylsilanamine (yellow oil, 5.50 g, yield 98% (molar basis)).

NMR (400 MHz, C6D6) 7.72-7.65 (m, 2H), 7.59-7.21 (m, 5H), 7.05 (s, 1H) 3.73-3.65 (m, 1H), 3.33-3.21 (m, 3H), 3.11-2.85 (m, 1H), 1.66-1.51 (m, 3H), 1.51-1.34 (m, 4H), 1.26 (s, 9H), 1.12 (s, 9H), 1.24-1.18 (m, 6H), 1.06 (s, 9H), 1.04-0.99 (m, 1H), 0.64-0.58 (m, 1H), 0.54-0.49 (m, 1H), 0.30 (s, 1.5H), 0.19 (s, 1.5H)

Step 2: Preparation of Transition Metal Compound

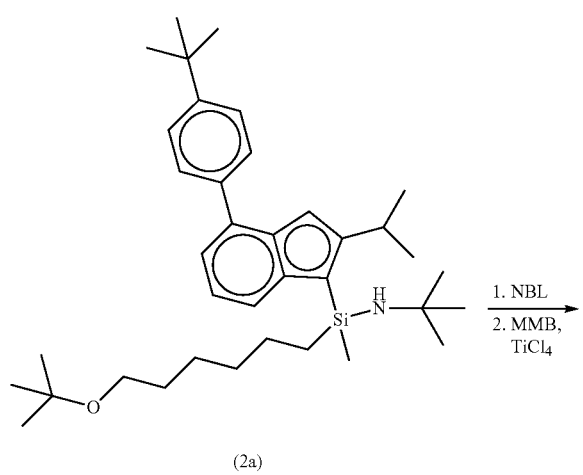

(2a)

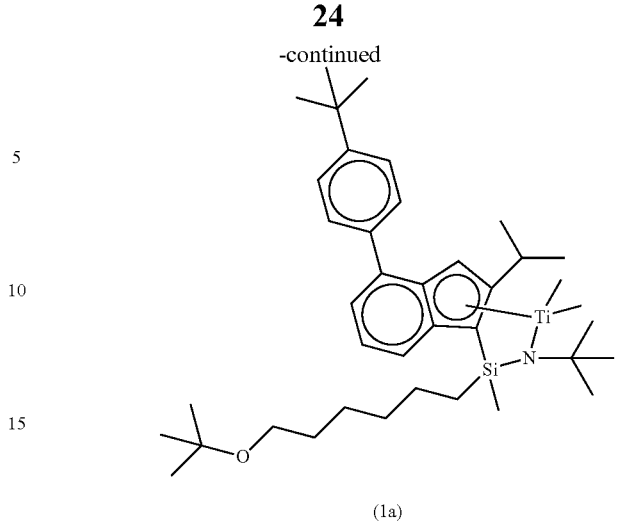

(1a)

The ligand compound (2a) (4.81 g, 8.6 mmol) prepared in the step 1 was put in a 100 ml schlenk flask, and toluene (43 ml) was added, followed by cooling to −20° C. or lower. The solution was sufficiently cooled by stirring for 5 min, and NBL (7.2 ml, 2.5 M in Hexane) was added to the resulting mixed solution, followed by lithiation. It was confirmed that the color of the mixed solution changed from light yellow to dark yellow after lithiation. After completion of the lithiation reaction, the resulting reaction solution was cooled to 0° C., MMB (Methyl Magnesium Bromide) (8.6 ml, 3 M in ether) was added, and the temperature was immediately lowered to −20° C. and TiCl$_4$ (8.6 ml, 1 M in toluene) was added. When added, smoke was generated and the reaction solution immediately turned brown. After the addition, o/n stirring was performed, and after completion, salts were removed through a filter to obtain a brown oil-phase transition metal compound (1a) (brown oil, 4.5 g, yield 82% (molar basis)).

NMR (400 MHz, C6D6), 7.25-7.75 (m, 8H), 3.20-3.36 (m, 2H), 3.20-2.64 (m, 4H) 2.64-2.74 (m, 1H), 1.59-1.71 (m, 4H), 1.53 (s, 9H), 1.40-1.35 (m, 2H), 1.25 (s, 9H), 1.14 (s, 9H) 1.12 (s, 6H), 0.97 (s, 3H) 0.58 (s, 3H), 0.12 (s, 3H)

Synthesis Example 2-2

Step 1: Preparation of Ligand Compound 4-(3,5-di-tert-butylphenyl)-2-isopropyl-1H-indene (1.39 g, 4 mmol) was added in a 50 ml schlenk flask as a Cp unit, and THF (13 ml) was add thereto, followed by cooling to −20° C. or less. After the cooled mixed solution was stirred for 5 minutes, NBL (1.7 ml, 2.5M in hexane) was added and reacted for overnight to prepare lithiated Cp. When the NBL was added, the mixed solution turned reddish brown.

Dichloro(tert-butoxy)hexyl)methylsilane (1.14 g) was added in another 100 mL schlenk flask, and THF (13 ml) was add thereto. After cooling the schlenk flask to −20° C. or less, the lithiated Cp prepared above was added dropwise to react. When the reaction was completed, the solvent in the resulting reactant was removed by distillation under vacuum reduced pressure, and the resulting salt was filtered off using hexane (Hex). After t-BuNH$_2$ (1.7 ml) was added to the resulting reactant to react, the resulting precipitate was filtered off using hexane, and a ligand compound of 1-(6-(tert-butoxy)hexyl)-N-(tert-butyl)-1-(4-(3,5-di-tertbutylphenyl)-2-isopropyl-1H-inden-1-yl)-1-methylsilanamine was obtained (yellow oil, 2.41 g, yield 97% (molar basis)).

NMR (400 MHz, C6D6), 7.70-7.68 (m, 1H), 7.60-7.47 (m, 4H), 7.34-7.19 (m, 2H), 7.07 (s, 0.5H), 6.89 (s, 0.5H), 3.36-3.21 (m, 4H), 3.12 (s, 1H), 2.52-2.44 (m, 0.5H), 2.00-1.92 (m, 0.5H), 1.72-1.39 (m, 8H), 1.39 (s, 9H), 1.31 (s, 9H), 1.23 (s, 3H) 1.19 (s, 3H), 1.13 (s, 9H) 0.98 (s, 9H) 0.32 (s, 1H), 0.25 (s, 0.5H), 0.20 (s, 1H), 0.12 (s, 0.5H)

Step 2: Preparation of Transition Metal Compound

The ligand compound of 1-(6-(tert-butoxy)hexyl)-N-(tert-butyl)-1-(4-(3,5-di-tert-butylphenyl)-2-isopropyl-1H-inden-1-yl)-1-methylsilanamine (2.4 g, 3.9 mmol) prepared in step 1 was added in a 100 ml schlenk flask, and toluene (13 ml) was add thereto, followed by cooling to −20° C. or less. After sufficiently cooling by stirring for 5 minutes, NBL (5.1 ml, 2.5 M in hexane) was added to the resulting mixed solution to perform lithiation. It was confirmed that the color of the mixed solution turned brown after lithiation. When the lithiation was completed, the resulting reaction solution was cooled to 0° C. After NMB (13 ml, 3 M in ether) was added thereto, the temperature was immediately lowered to −20° C., and TiCl$_4$ (3.9 ml, 1 M in toluene) was added. Smoke was generated at the time of addition and the reaction solution immediately turned brown. After the addition, o/n stirring was performed, and then the salt was removed through a filter to obtain a transition metal compound (1b) (brown oil, 2.16 g, yield 80% (molar basis)).

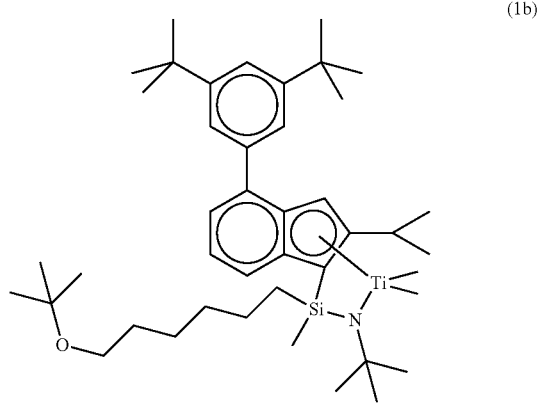

(1b)

NMR (400 MHz, C6D6), 7.79-7.76 (m, 2H), 7.64-7.47 (m, 5H), 3.35-3.21 (m, 2H), 2.76-2.49 (s, 2H), 1.99-1.91 (m, 4H), 1.70-1.60 (m, 4H), 1.53 (s, 9H), 1.51-1.44 (m, 4H), 1.36 (s, 9H), 1.30 (s, 9H), 1.20 (s, 6H), 1.13 (s, 9H), 0.59 (s, 3H), 0.12 (s, 3H)

Comparative Synthesis Example 2-1

Step 1: Preparation of Ligand Compound 4-(4-(tert-butyl)phenyl)-2-methyl-1H-indene (2.6 g, 10 mmol) as a Cp unit was put in a 100 mL schlenk flask, and THF (35 ml) was added thereto, and cooled to −20° C. or lower. The cooled mixed solution was stirred for 5 min, and then NBL (4.2 ml, 2.5 M in hexane) was added thereto, and allowed to react overnight to prepare lithiated Cp. When the NBL was added, the mixed solution turned brown.

Dichloro(tert-butoxy)hexyl)methylsilane (2.84 g) as tether silane was put in another 100 ml schlenk flask, and MTBE (35 ml) was added thereto. The schlenk flask was cooled to −20° C. or lower, and then the prepared lithiated Cp was added dropwise and allowed to react. When the reaction was completed, the solvent in the reaction product was removed by distillation under vacuum, and the resulting salt was removed by filtration using hexane (Hex). t-BuNH$_2$ (4.5 ml) was added to the resulting reaction product and allowed to react, and then the resulting precipitate was removed by filtration using hexane to obtain a ligand compound of 1-(6-(tert-butoxy)hexyl)-N-(tert-butyl)-1-(4-(4-(tert-butyl)phenyl)-2-methyl-1H-inden-1-yl)-1-methylsilanamine (yellow oil, 5.2 g, yield 98% (molar basis)).

NMR (400 MHz, C6D6) 7.78-7.67 (m, 2H), 7.60-7.7.19 (m, 5H), 7.05 (s, 1H) 3.68 (s, 1H), 3.27-3.06 (m, 3H), 2.92-2.86 (m, 1H), 1.26-1.12 (m, 4H), 1.11 (s, 9H), 1.09 (s, 9H), 1.08 (s, 3H), 1.06 (s, 9H), 1.04-0.99 (m, 4H), 0.54-0.49 (m, 1H), 0.18 (s, 1.5H), 0.05 (s, 1.5H)

Step 2: Preparation of Transition Metal Compound

The ligand compound 1-(6-(tert-butoxy)hexyl)-N-(tert-butyl)-1-(4-(4-(tert-butyl)phenyl)-2-methyl-1H-inden-1-yl)-1-methylsilanamine (4.6 g, 8.6 mmol) prepared in the step 1 was put in a 100 ml schlenk flask, and toluene (43 ml) was added, followed by cooling to −20° C. or lower. The solution was sufficiently cooled by stirring for 5 min, and NBL (7.2 ml, 2.5 M in Hexane) was added to the resulting mixed solution, followed by lithiation. It was confirmed that the color of the mixed solution changed from light yellow to dark yellow after lithiation. After completion of the lithiation reaction, the resulting reaction solution was cooled to 0° C., MMB (8.6 ml, 3 M in ether) was added, and the temperature was immediately lowered to −20° C. and TiCl$_4$ (8.6 ml, 1 M in toluene) was added. When added, smoke was generated and the reaction solution immediately turned brown. After the addition, o/n stirring was performed, and after completion, salts were removed through a filter to obtain a brown oil-phase transition metal compound (A) having the following structure (brown oil, 3.9 g, yield 74% (molar basis)).

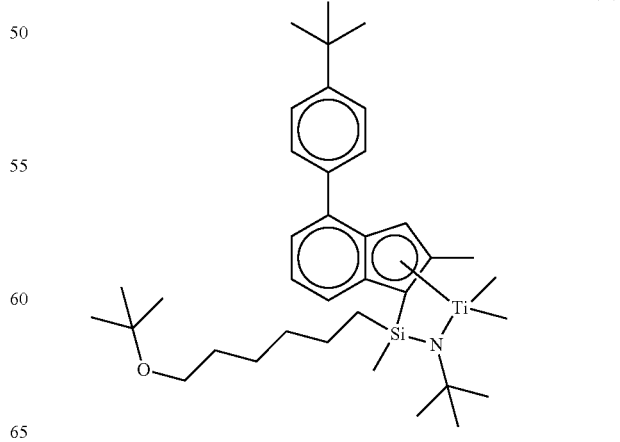

(A)

NMR (400 MHz, C6D6), 7.75-7.12 (m, 8H), 3.30-3.26 (m, 2H), 2.68-2.45 (m, 1H), 1.76-1.52 (m, 6H), 1.50-1.13 (m, 4H), 1.25 (s, 9H), 1.20-1.15 (m, 2H), 1.14 (s, 9H), 1.10 (s, 9H) 0.96 (s, 3H), 0.58 (s, 3H), 0.11 (s, 3H)

Comparative Synthesis Example 2-2

Step 1: Preparation of Ligand Compound 2-isopropyl-4-phenyl-1H-indene (0.94 g, 4 mmol) as a Cp unit was put in a 50 mL schlenk flask, and THF (13 ml) was added thereto, and cooled to −20° C. or lower. The cooled mixed solution was stirred for 5 min, and then NBL (1.7 ml, 2.5 M in hexane) was added thereto, and allowed to react overnight to prepare lithiated Cp. When the NBL was added, the mixed solution turned reddish brown.

Dichloro(tert-butoxy)hexyl)methylsilane (1.16 g) as a tether silane was put in another 100 ml schlenk flask, and THF (13 ml) was added thereto. The schlenk flask was cooled to −20° C. or lower, and then the prepared lithiated Cp was added dropwise and allowed to react. When the reaction was completed, the solvent in the reaction product was removed by distillation under vacuum, and the resulting salt was removed by filtration using hexane (Hex). t-BuNH2 (1.7 ml) was added to the resulting reaction product and allowed to react, and then the resulting precipitate was removed by filtration using hexane to obtain a ligand compound of 1-(6-(tert-butoxy)hexyl)-N-(tert-butyl)-1-(2-isopropyl-4-phenyl-1H-inden-1-yl)-1-methylsilanamine (yellow oil, 1.98 g, yield 98% (molar basis)).

NMR (400 MHz, C6D6), 7.68-7.63 (m, 2H), 7.57-7.41 (m, 2H), 7.41-7.16 (m, 4H), 6.98 (s, 1H), 3.67 (s, 1H), 3.30-3.19 (m, 4H), 3.06-2.99 (m, 0.5H), 2.94-2.87 (m, 0.5H), 2.52-2.42 (m, 0.5H), 2.02-1.92 (m, 0.5H), 1.69-1.38 (m, 8H), 1.13 (s, 9H), 1.05 (s, 6H), 0.98 (s, 9H), 0.27 (s, 1.5H), 0.16 (s, 1.5H)

Step 2: Preparation of Transition Metal Compound

The ligand compound 1-(6-(tert-butoxy)hexyl)-N-(tert-butyl)-1-(4-(3-di-tert-butylphenyl)-2-isopropyl-1H-inden-1-yl)-1-methylsilanamine (1.98 g, 3.9 mmol) prepared in the step 1 was put in a 100 ml schlenk flask, and toluene (13 ml) was added, followed by cooling to −20° C. or lower. The solution was sufficiently cooled by stirring for 5 min, and NBL (5.1 ml, 2.5 M in Hexane) was added to the resulting mixed solution, followed by lithiation. It was confirmed that the color of the mixed solution turned yellow after lithiation. After completion of the lithiation reaction, the resulting reaction solution was cooled to 0° C., MMB (13 ml, 3 M in ether) was added, and the temperature was immediately lowered to −20° C. and TiCl4 (3.9 ml, 1 M in toluene) was added. When added, smoke was generated and the reaction solution immediately turned brown. After the addition, o/n stirring was performed, and after completion, salts were removed through a filter to obtain a brown oil-phase transition metal compound (B) (brown oil, 1.79 g, yield 79% (molar basis)).

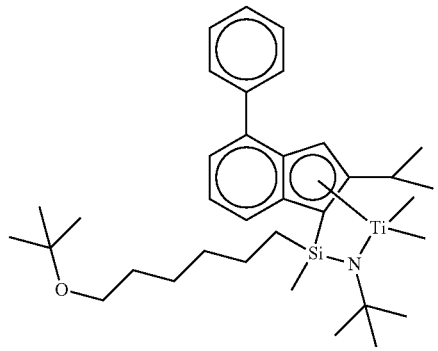

(B)

NMR (400 MHz, C6D6), 7.71-7.69 (m, 2H), 7.52-7.44 (m, 2H), 7.29-7.22 (m, 1H), 7.29-7.17 (s, 4H), 3.38-3.24 (m, 2H), 2.88-2.41 (m, 2H), 1.68-1.60 (m, 7H), 1.50 (s, 9H), 1.30-1.20 (m, 5H), 1.19 (s, 6H), 1.14 (s, 9H), 0.58 (s, 3H), 0.07 (s, 3H)

Comparative Synthesis Example 2-3

A transition metal compound (C) having the following structure prepared by a known method was used.

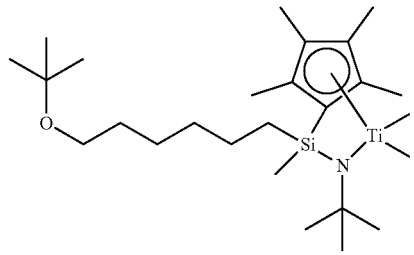

(C)

Comparative Synthesis Example 2-4

A transition metal compound (D) having the following structure prepared by a known method was used.

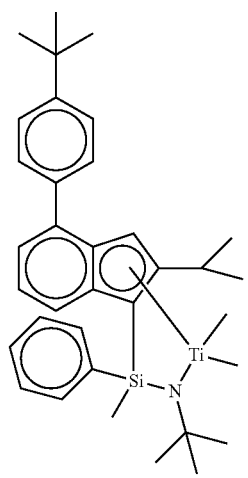

(D)

Preparation of Hybrid Supported Catalyst

Preparation Example 1

(1) Preparation of Support

Silica (SYLOPOL 948™, manufactured by Grace Davison) was dehydrated and dried at a temperature of 600° C. for 12 hours under vacuum.

(2) Preparation of Hybrid Supported Catalyst 10 g of the dried silica was put in a glass reactor at room temperature, and 100 mL of toluene was added, followed by stirring. After sufficiently dispersing silica, 106 ml of a 10 wt % methylaluminoxane (MAO)/toluene solution was added, and slowly reacted at 40° C. and 200 rpm for 14 hr under stirring. After reaction, the stirring was stopped, and settling was carried out for 30 minutes and the remaining solution was subjected to decantation. 100 mL of toluene was added and stirred for 10 min, and settling was carried out for 30 minutes, and then the remaining solution was subjected to decantation. 50 ml of toluene was added, and then the first transition metal compound 0.15 mmol/gSiO$_2$ according to Synthesis Example 1 was dissolved in toluene, and this solution was added thereto, and allowed to react for 1 hr. After the reaction was completed, the second transition metal compound 0.18 mmol/gSiO$_2$ according to Synthesis Example 2-1 was dissolved in toluene, and this solution was added, and allowed to react for 2 hr under stirring. After the reaction was completed, the stirring was stopped, and a toluene layer was separated and removed, and 100 ml of normal hexane was added, followed by stirring for 10 min. After the stirring was completed, settling was carried out for 30 minutes, and then the remaining solution was removed, and remaining hexane was removed under reduced pressure to obtain a hybrid supported catalyst.

Preparation Example 2

A hybrid supported catalyst was prepared in the same manner as in Preparation Example 1, except that the compound prepared in Synthesis Example 2-2 was used, instead of the second transition metal compound in Preparation Example 1, and the first and second transition metal compounds were used in the amounts as described in Table 1 below.

Preparation Example 3

A hybrid supported catalyst was prepared in the same manner as in Preparation Example 2, except that, in Preparation Example 2, the first and second transition metal compounds were used in the amounts as described in Table 1 below.

Comparative Preparation Example 1

A hybrid supported catalyst was prepared in the same manner as in Preparation Example 1, except that the transition metal compound (A) prepared in Comparative Synthesis Example 2-1 was used, instead of the second transition metal compound in Preparation Example 1.

Comparative Preparation Example 2

A hybrid supported catalyst was prepared in the same manner as in Preparation Example 1, except that the transition metal compound (B) prepared in Comparative Synthesis Example 2-2 was used, instead of the second transition metal compound in Preparation Example 1, and the first and second transition metal compounds were used in the amounts as described in Table 1 below.

Comparative Preparation Example 3

A hybrid supported catalyst was prepared in the same manner as in Preparation Example 1, except that the transition metal compound (C) prepared in Comparative Synthesis Example 2-3 was used, instead of the second transition metal compound in Preparation Example 1, and the first and second transition metal compounds were used in the amounts as described in Table 1 below.

Comparative Preparation Example 4

A hybrid supported catalyst was prepared in the same manner as in Preparation Example 1, except that the transition metal compound (D) prepared in Comparative Synthesis Example 2-4 was used, instead of the second transition metal compound in Preparation Example 1, and the first and second transition metal compounds were used in the amounts as described in Table 1 below.

Preparation of Polyolefin

Example 1

Under conditions as shown in Table 1 below, ethylene homopolymerization was carried out using the hybrid supported catalyst of Preparation Example 1 (the compounds of Synthesis Example 1 and 2-1).

To prepare an olefin polymer, a 2-L metal alloy reactor, which is equipped with a mechanical stirrer and temperature-controllable and may be used for high-pressure reaction, was prepared. The reactor was dried at 120° C. under vacuum, and cooled, and 0.9 kg of purified n-hexane was introduced, and 1350 ppm of triethylaluminum (1 M solution in hexane) was introduced at room temperature, and then 15 mg of the supported metallocene catalyst prepared in Preparation Example 1 was introduced into the reactor. Thereafter, the temperature of the reactor was slowly raised to 80° C., and then a polymerization process was carried out for 2 hr. At this time, ethylene gas was continuously injected to maintain the pressure of the reactor at about 9 kgf/cm$^2$. Hydrogen gas was injected at 0.16 vol %, based on the ethylene. After the reaction was completed, unreacted ethylene and hydrogen were vented.

Examples 2 and 3

Each polyethylene was prepared in the same manner as in Example 1, except that the catalyst and polymerization conditions were changed as shown in Table 1 below.

Comparative Example 1

A high-density polyethylene (CE2080™, manufactured by LG Chem.) prepared by using a Ziegler-Natta catalyst was used.

Comparative Examples 2 to 4

Each polyethylene was prepared in the same manner as in Example 1, except that the catalyst and polymerization conditions were changed as shown in Table 1 below.

TABLE 1

| | Catalyst | | | Polymerization conditions | | | | |
|---|---|---|---|---|---|---|---|---|
| | Kind of catalyst | First transition metal compound/ content (mmol/ gSiO$_2$) | Second transition metal compound/ content (mmol/ gSiO$_2$) | Temperature (° C.) | Pressure (bar) | Input amount of catalyst (mg) | Input amount of H$_2$ (vol % with respect to ethylene) | HDPE yield (g) |
| Ex. 1 | Preparation Example 1 | Synthesis Example 1/ 0.15 | Synthesis Example 2-1/ 0.18 | 80 | 9 | 15 | 0.16 | 207 |
| Ex. 2 | Preparation Example 2 | Synthesis Example 1/ 0.24 | Synthesis Example 2-2/ 0.12 | 80 | 9 | 11.1 | 0.12 | 204 |
| Ex. 3 | Preparation Example 3 | Synthesis Example 1/ 0.15 | Synthesis Example 2-2/ 0.18 | 80 | 9 | 14.0 | 0.19 | 212 |
| Comp. Ex. 1 | — | Ziegler-Natta catalyst | — | — | — | — | — | — |
| Comp. Ex. 2 | Comparative Preparation Example 2 | Synthesis Example 1/ 0.10 | Comparative Synthesis Example 2-2/ 0.25 | 80 | 9 | 17.3 | 0.25 | 210 |
| Comp. Ex. 3 | Comparative Preparation Example 3 | Synthesis Example 1/ 0.10 | Comparative Synthesis Example 2-3/ 0.10 | 80 | 9 | 19.9 | 0.23 | 206 |
| Comp. Ex. 4* | Comparative Preparation Example 4 | Synthesis Example 1/ 0.15 | Comparative Synthesis Example 2-4/ 0.18 | 80 | 9 | 15 | 0.16 | 86 |

*in Comparative Example 4, activity was low during the polymerization due to the absence of the tether group in the second transition metal compound which was used in the preparation of polyethylene, and fouling occurred in the reactor due to leaching.

Experimental Example 1

The activity as a single catalyst was evaluated for the transition metal compound used in the preparation of the hybrid supported catalyst of the present invention. In detail, homopolyethylene was prepared by using the transition metal compounds prepared in Synthesis Examples and Comparative Synthesis Examples as a single catalyst, respectively. Polymerization activity and a weight average molecular weight (Mw) and a molecular weight distribution (PDI) of the prepared polymers were measured, respectively. The results are shown in Table 2 below.

Preparation of Supported Metallocene Catalyst

Silica gel (SYLOPOL 952X™, calcined under 250° C., 7 g) was put in a glass reactor under argon (Ar), and 53.1 mL (corresponding to 10 mmol per 1 g of silica) of 10 wt % methylaluminoxane (MAO) toluene solution was slowly introduced at room temperature and stirred at 95° C. for 12 hr. After the reaction was completed, the reactor was cooled to room temperature and left for 15 min, and the solvent was decanted using a cannula. 50 mL of toluene was introduced and stirred for 1 min, and left for 15 min, and the solvent was decanted using the cannula. Then, 50 mL of toluene was introduced, and 60 μmol (corresponding to 60 μmol per 1 g of silica) of each transition metal compound prepared in Synthesis Examples or Comparative Synthesis Examples was dissolved in 10 mL of toluene and transferred to the reactor using the cannula. After stirring at 80° C. for 2 hr, the reactor was cooled and left for 15 min, and the solvent was decanted using the cannula. 50 mL of toluene was introduced and stirred for 1 min, and left for 15 min, and the solvent was decanted using the cannula. This procedure was repeated twice. In the same manner, 50 mL of hexane was introduced and stirred for 1 min, and left for 15 min, and the solvent was decanted using the cannula. 3.1 ml (antistatic agent content=2 parts by weight, based on 100 parts by weight of silica) of an antistatic agent (Atmer 163™, CRODA) dissolved in hexane was transferred using the cannula. Stirring was performed at room temperature for 20 min, and the solution was transferred to a glass filter to remove the solvent. Drying was performed at room temperature under vacuum for 5 hr to Obtain Each Supported Catalyst.

Preparation of Homopolyethylene

A 600 ml metal alloy reactor, which is equipped with a mechanical stirrer and temperature-controllable and may be used for high-pressure reaction, was prepared. The reactor was dried at 120° C. under vacuum, and cooled, and 450 ppm of triethylaluminum (1 M solution in hexane) was introduced at room temperature, and then 15 mg of each transition metal compound supported catalyst prepared in Synthesis Examples or Comparative Synthesis Examples was introduced into the reactor. Thereafter, the temperature of the reactor was slowly raised to 80° C., and then a polymerization process was carried out for 1 hr. At this time, ethylene gas was continuously injected to maintain the pressure of the reactor at about 9 kgf/cm². After the reaction was completed, unreacted ethylene was vented.

Evaluation (1) Polymerization Activity (kg PE/g cat hr): determined by a ratio of the weight (kg PE) of the produced polymer per the weight (g) of the supported catalyst used, based on the unit time (h).

(2) Weight average molecular weight (Mw, g/mol) and Molecular weight distribution (PDI, polydispersity index): A weight average molecular weight (Mw) and a number average molecular weight (Mn) were measured by gel permeation chromatography (GPC), and a ratio of Mw/Mn was determined as a molecular weight distribution. In detail, measurement was performed using a Waters PL-GPC$_{220}$ instrument using a PLgel MIX-B column of 300 mm length from Polymer Laboratories. At this time, the evaluation temperature was 160° C., and 1,2,4-trichlorobenzene was used as a solvent, and the flow rate was 1 mL/min. A sample was prepared at a concentration of 10 mg/10 mL, and supplied in an amount of 200 μL. A calibration curve created by using polystyrene standards was used to derive Mw and Mn values. The molecular weights (g/mol) of the polystyrene standards were nine types of 2,000/10,000/30,000/70,000/200,000/700,000/2,000,000/4,000,000/10,000,000.

TABLE 2

| Kind of transition metal compound | Polymerization activity (kg PE/g cat · hr) | Mw (g/mol) | PDI |
|---|---|---|---|
| Synthesis Example 1 | 7.4 | 87,000 | 2.4 |
| Synthesis Example 2-1 | 3.1 | 1,230,000 | 2.3 |
| Synthesis Example 2-2 | 2.6 | 1,506,000 | 2.4 |
| Comparative Synthesis Example 2-1 | 0.9 | 1,650,000 | 2.7 |
| Comparative Synthesis Example 2-2 | 1.1 | 984,000 | 2.8 |
| Comparative Synthesis Example 2-3 | 3.0 | 940,000 | 2.9 |

As a result of the experiments, the first and second transition metal compounds used in the preparation of the hybrid supported catalyst according to the present invention exhibited excellent polymerization activity, even when they were used as a single catalyst. In contrast, when the transition metal compound prepared in comparative Synthesis Example 2-1 was used as a single catalyst, it exhibited very low polymerization activity of 0.9 kg PE/g cat hr, suggesting that its catalytic activity also deteriorates when used as a hybrid supported catalyst, and its effect of improving physical properties of polymers also deteriorate.

Experimental Example 2

The hybrid supported catalysts used in Examples and Comparative Examples, and polyethylenes prepared by using the catalysts were measured for physical properties by the following methods, and the results are shown in Table 3 below.

(1) Catalytic activity (Activity, kg PE/g cat hr): catalytic activity was evaluated during polymerization of each polyethylene according to Examples and Comparative Examples, and determined by a ratio of the weight (kg PE) of the produced polymer per the weight (g) of the supported catalyst used, based on the unit time (h).

(2) Weight average molecular weight (Mw, g/mol) and Molecular weight distribution (PDI, polydispersity index): A weight average molecular weight (Mw) and a number average molecular weight (Mn) of each polyethylene prepared in Examples and Comparative Examples were measured by gel permeation chromatography (GPC), respectively and a ratio of Mw/Mn was determined as a molecular weight distribution (PDI).

In detail, measurement was performed using a Waters PL-GPC$_{220}$ instrument using a PLgel MIX-B column of 300 mm length from Polymer Laboratories. At this time, the evaluation temperature was 160° C., and 1,2,4-trichlorobenzene was used as a solvent, and the flow rate was 1 mL/min. A sample was prepared at a concentration of 10 mg/10 mL, and supplied in an amount of 200 μL. A calibration curve created by using polystyrene standards was used to derive Mw and Mn values. The molecular weights (g/mol) of the polystyrene standards were nine types of 2,000/10,000/30,000/70,000/200,000/700,000/2,000,000/4,000,000/10,000,000.

(3) MI$_{5.0}$ and MFRR (21.6/5): Melt Index (MI$_{5.0}$) of each polyethylene prepared in Examples and Comparative Examples was measured according to ASTM D1238 (condition E, 190° C., under a load of 5.0 kg) standard. Further, a melt flow rate ratio (MFRR, 21.6/5) of the polyethylene was calculated by dividing MFR$_{21.6}$ by MFR$_5$. MFR$_{21.6}$ was measured at a temperature of 190° C. under a load of 21.6 kg according to ASTM D 1238, and MFR$_5$ was measured at a temperature of 190° C. under a load of 5.0 kg according to ASTM D 1238.

(4) Complex viscosity ($\eta^*(\omega 500)$): Mooney viscosity must be adjusted for use of CPE in wires and cables. Accordingly, when the complex viscosity ($\eta^*(\omega 500)$) measured at a frequency ($\omega$) of 500 rad/s is 800 Pas, the Mooney viscosity is expected to coincide, and thus it was set to an equivalent level.

In detail, the complex viscosity of polyethylene was measured at a frequency ($\omega$) of 0.05 rad/s with ARES (Advanced Rheometric Expansion System, ARES G2) of TA instruments. The samples were set using parallel plates with a diameter of 25.0 mm at 190° C. so that the gap between plates becomes 2.0 mm. The measurement was performed in a dynamic strain frequency sweep mode at the strain of 5%, the frequency from 0.05 rad/s to 500 rad/s, 10 points for each decade, a total of 41 points.

(5) Density: density (g/cm$^3$) of each polyethylene was measured according to the method of ASTM D-1505.

(6) Fraction (%): GPC analysis was performed, and the fraction was calculated as an area (%) occupied by log Mw section relative to a total area in the resulting molecular weight distribution curve. The sum of the fraction is 100±1, which may not be exactly 100.

The GPC analysis was specifically performed under the following conditions.

Waters PL-GPC$_{220}$ was used as the gel permeation chromatography (GPC) instrument, and a Polymer Laboratories PLgel MIX-B 300 mm length column was used. An evaluation temperature was 160° C., and 1,2,4-trichlorobenzene was used for a solvent at a flow rate of 1 mL/min. Each polyethylene sample was pretreated by dissolving in 1,2,4-trichlorobenzene containing 0.0125% of BHT for 10 hours using a GPC analyzer (PL-GP220), and the sample with a concentration of 10 mg/10 mL was supplied in an amount of 200 μL. Mw and Mn were obtained using a calibration curve formed using a polystyrene standard. 9 kinds of the polystyrene standard were used with the molecular weight of 2000 g/mol, 10000 g/mol, 30000 g/mol, 70000 g/mol, 200000 g/mol, 700000 g/mol, 2000000 g/mol, 4000000 g/mol, and 10000000 g/mol.

(7) MDR torque ($M_H$-$M_L$):

MDR torque of each polyethylene sample was measured with Alpha Technologies Production MDR (Moving Die Rheometer) in order to evaluate the degree of cross-linking of polyethylene.

Specifically, a sample sheet was prepared at 140° C. for 10 min after mixing 100 g of each polyethylene sample prepared in Examples and Comparative Examples, 0.4 g of a phenolic antioxidant (AO), and 1.2 g of a cross-linking agent (DCP, dicumyl peroxide) at 80° C. Then, a $M_H$ value and a $M_L$ value of the sample sheet were measured at 180° C. for 10 min with MDR (Moving die rheometer). The MDR torque ($M_H$-$M_L$) was calculated by subtracting the $M_L$ value from the $M_H$ value. Herein, the $M_H$ is a maximum vulcanizing torque measured at full cure, and the $M_L$ is a minimum vulcanizing torque stored.

TABLE 3

| | PE | | | | | | | | |
|---|---|---|---|---|---|---|---|---|---|
| | | | | | | | | Fraction (%) | |
| | Catalytic activity (kg PE/g cat · 2 hr) | Mw (g/mol) | PDI | $MI_{5.0}$ (g/ 10 min) | MFRR (21.6/5) | $\eta^*(\omega\ 500)$ (Pa · s) | Density (g/cm$^3$) | log Mw of 3.5 or less | log Mw of more than 3.5~4.0 or less | MDR torque ($M_H$-$M_L$) (Nm) |
| Ex. 1 | 13.8 | 245,000 | 8.9 | 1.34 | 15.2 | 796 | 0.950 | 0.96 | 4.32 | 8.7 |
| Ex. 2 | 18.4 | 196,000 | 6.1 | 2.41 | 10.3 | 800 | 0.949 | 0.80 | 3.93 | 11.5 |
| Ex. 3 | 11.2 | 277,000 | 10.3 | 0.81 | 18.6 | 810 | 0.953 | 1.20 | 4.65 | 7.7 |
| Comp. Ex. 1 | — | 177,000 | 9.1 | 1.30 | 15.2 | 800 | — | 2.64 | 8.89 | 5.6 |
| Comp. Ex. 2 | 12.1 | 148,000 | 5.8 | 0.69 | 19.0 | 794 | — | 2.19 | 8.43 | 6.5 |
| Comp. Ex. 3 | 10.4 | 155,000 | 5.7 | 0.77 | 18.4 | 804 | 0.955 | 1.55 | 5.77 | 7.3 |

As a result of the experiments, the hybrid supported catalysts used in Examples 1 to 3 showed excellent catalytic activity equivalent to or higher than those of the catalysts used in Comparative Examples, and in particular, the hybrid supported catalysts of Examples 1 and 2 showed higher catalytic activity than the catalysts of Comparative Examples.

Further, as compared with those of Comparative Examples, polyethylenes of Examples 1 to 3 prepared by using the hybrid supported catalysts showed the greatly reduced low molecular content, in which a fraction at log Mw of 3.5 or less was 1.2% or less, and a fraction at log Mw of more than 3.5 to 4.0 or less was 4.65%, and at the same time, showed a broad molecular weight distribution of 6.1 or more. In addition, their MDR torque was 7.7 or more, indicating high degree of crosslinking, as compared to Comparative Examples.

Example 3 was superior to Comparative Examples, but showed a slight reduction in the effects of reducing the low molecular content and improving the degree of crosslinking, as compared with Examples 1 and 2. These results are attributed to the difference of the catalysts used in the preparation of polyethylene. Example 3 included the transition metal compounds in the same combination as in Example 2, but they were different from each other in terms of the mixing ratio. In addition, Example 3 included the transition metal compounds in the same mixing ratio as in Example 1, but the structures of the second transition metal compounds were different from each other. Accordingly, the hybrid supported catalyst including a combination of the first and second transition metal compounds according to the present invention may exhibit more excellent effects in view of catalytic activity and improvement of physical properties of polyethylene, as compared with the existing catalysts. It can be seen that when the mixing ratio is optimized according to the combination of the first and second transition metal compounds, catalytic activity and physical properties of the prepared polyethylene may be further improved.

The invention claimed is:

1. A hybrid supported catalyst comprising:
one or more of a first transition metal compound represented by Chemical Formula 1;
one or more of a second transition metal compound represented by Chemical Formula 2; and
a support on which the first and second transition metal compounds are supported:

$$(Cp^1R_{11})_m(Cp^2R_{12})M_1(Z_1)_{3-m} \quad \text{[Chemical Formula 1]}$$

in Chemical Formula 1, $M_1$ is a transition metal of Group 4;

$Cp^1$ and $Cp^2$ are the same as or different from each other, and each independently, any one selected from the group consisting of cyclopentadienyl, indenyl, 4,5,6,7-tetrahydro-1-indenyl, and fluorenyl radicals, which are unsubstituted or substituted with $C_{1-20}$ hydrocarbon;

$R_{11}$ and $R_{12}$ are the same as or different from each other, and each independently, hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, $C_{2-20}$ alkynyl, or $C_{2-20}$ heteroaryl comprising one or more heteroatoms of N, O, or S;

$Z_1$ is halogen, $C_{1-20}$ alkyl, $C_{2-20}$ alkenyl, $C_{7-40}$ alkylaryl, $C_{7-40}$ arylalkyl, $C_{6-20}$ aryl, an amino group, $C_{2-20}$ alkylalkoxy, or $C_{7-40}$ arylalkoxy; and m is 1 or 0;

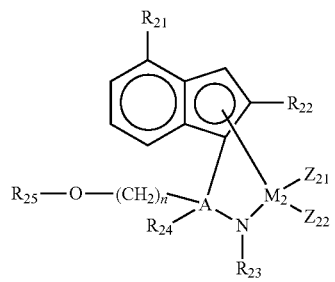

[Chemical Formula 2]

in Chemical Formula 2,

A is carbon or silicon, $M_2$ is a transition metal of Group 4, $R_{21}$ is $C_{6-20}$ aryl substituted with $C_{1-20}$ alkyl, $R_{22}$ is $C_{3-20}$ branched alkyl, $R_{23}$ to $R_{25}$ are each independently $C_{1-20}$ alkyl, $Z_{21}$ and $Z_{22}$ are each independently halogen or $C_{1-10}$ alkyl, and n is an integer of 1 to 10.

2. The hybrid supported catalyst of claim 1, wherein $M_1$ is Ti, Zr, or Hf;

Cp$^1$ and Cp$^2$ are the same as or different from each other, and each independently, any one selected from the group consisting of cyclopentadienyl, indenyl, 4,5,6,7-tetrahydro-1-indenyl, and fluorenyl radicals, which are unsubstituted or substituted with $C_{1-10}$ alkyl;

$R_{11}$ and $R_{12}$ are each independently hydrogen, $C_{1-20}$ alkyl, $C_{2-20}$ alkoxyalkyl, $C_{6-20}$ aryl, $C_{7-20}$ arylalkyl, furanyl, or thiophenyl, wherein at least one of $R_{11}$ or $R_{12}$ is $C_{2-20}$ alkoxyalkyl; and $Z_1$ is halogen.

3. The hybrid supported catalyst of claim 1, wherein the first transition metal compound is selected from the group consisting of compounds having the following structures:

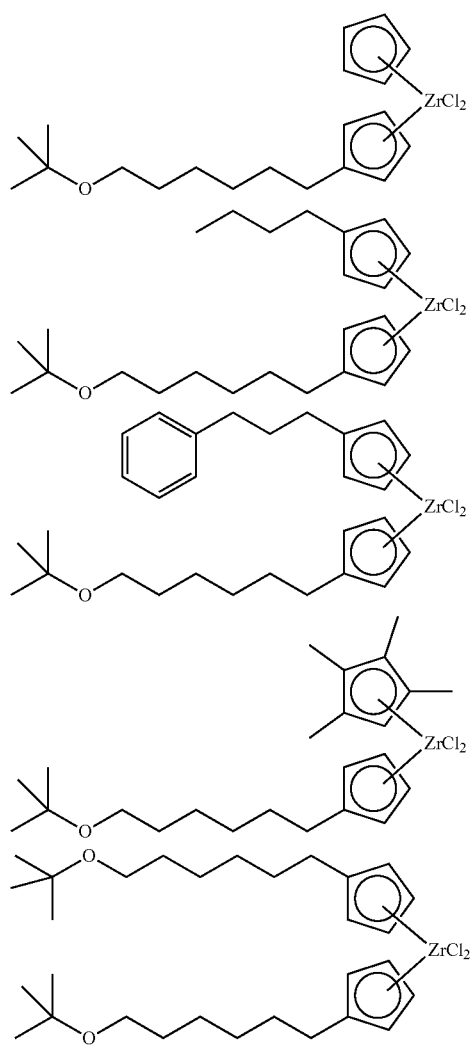

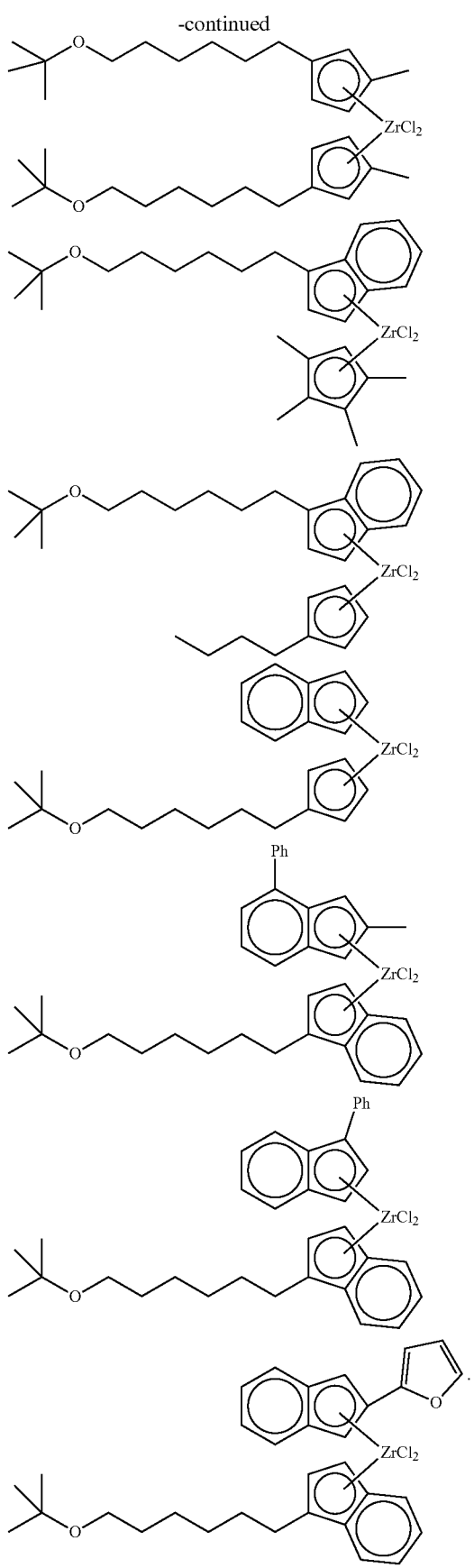

4. The hybrid supported catalyst of claim 1, wherein $M_2$ is titanium, and $Z_{21}$ and $Z_{22}$ are each independently $C_{1-4}$ alkyl.

5. The hybrid supported catalyst of claim 1, wherein $R_{21}$ is phenyl substituted with one or two of $C_{3-6}$ branched alkyl, and $R_{22}$ and $R_{23}$ are each independently $C_{3-6}$ branched alkyl.

6. The hybrid supported catalyst of claim 1, wherein A is silicon, $R_{25}$ is $C_{3-6}$ branched alkyl, and n is an integer of 4 to 6.

7. The hybrid supported catalyst of claim 1, wherein $R_{22}$ is isopropyl.

8. The hybrid supported catalyst of claim 1, wherein the second transition metal compound is selected from the group consisting of compounds having the following structures:

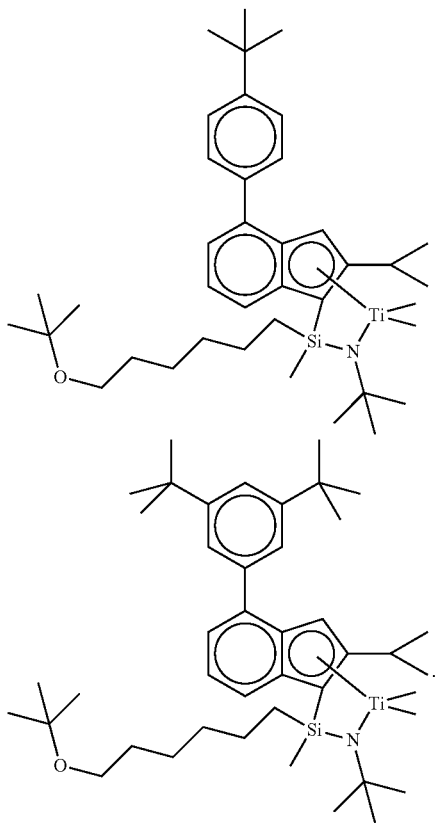

9. The hybrid supported catalyst of claim 1, wherein the first and second transition metal compounds are comprised at a molar ratio of 1:3 to 3:1.

10. The hybrid supported catalyst of claim 1, wherein the support comprises at least one of silica, alumina, or magnesia.

11. A method for preparing a polyolefin, comprising polymerizing an olefin monomer in the presence of a catalyst composition comprising the hybrid supported catalyst of claim 1.

12. The method of claim 11, wherein the catalyst composition further comprises one or more of a cocatalyst or an antistatic agent.

13. The method of claim 12, wherein the cocatalyst comprises a compound represented by any one of Chemical Formulae 9 to 11:

$$-[Al(R_a)-O]_m- \quad \text{[Chemical Formula 9]}$$

in Chemical Formula 9, $R_a$'s are the same as or different from each other, and each independently, halogen; $C_{1-20}$ hydrocarbon; or halogen-substituted $C_{1-20}$ hydrocarbon; and m is an integer of 2 or more;

$$J(R_b)_3 \quad \text{[Chemical Formula 10]}$$

in Chemical Formula 10, $R_b$'s are the same as or different from each other, and each independently, halogen; $C_{1-20}$ hydrocarbon; or halogen-substituted $C_{1-20}$ hydrocarbon; and J is aluminum or boron;

$$[E-H]^+[ZQ_4]^+ \text{ or } [E]^+[ZQ_4]^- \quad \text{[Chemical Formula 11]}$$

in Chemical Formula 11,

E is a neutral or cationic Lewis base;

H is a hydrogen atom;

Z is an element of Group 13; and

Q's are the same as or different from each other, and each independently, a $C_{6-20}$ aryl or $C_{1-20}$ alkyl group, of which is optionally substituted with halogen, $C_{1-20}$ hydrocarbon, alkoxy, or phenoxy.

14. The method of claim 12, wherein the antistatic agent is ethoxylated alkyl amine.

15. The method of claim 11, wherein the polymerization is performed while introducing hydrogen gas of 0.1% by volume to 0.2% by volume, based on a total volume of the olefin monomer.

16. The method of claim 11, wherein the olefin monomer is ethylene.

17. The method of claim 11, wherein in a molecular weight distribution curve of the polyolefin by gel permeation chromatography analysis, where the molecular weight distribution curve is obtained by plotting log value (log Mw) of weight average molecular weight (Mw) on the x-axis, and molecular weight distribution (dwt/d log Mw) with respect to the log value on the y-axis, an area ratio occupied by an area of log Mw of 3.5 or less relative to the total area of the distribution curve is 1.4% or less, and a molecular weight distribution is 6 to 15.

* * * * *